United States Patent
Tamura et al.

(10) Patent No.: US 6,820,274 B1
(45) Date of Patent: Nov. 16, 2004

(54) MAGENTO-OPTIC DISC RECORDING AND/OR REPRODUCING DEVICE

(75) Inventors: Kenichi Tamura, Kanagawa (JP); Tadami Nakamura, Saitama (JP); Tomohiro Yamada, Chiba (JP); Kazuhito Kurita, Kanagawa (JP); Satoru Minowa, Saitama (JP); Takashi Takamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 09/857,535
(22) PCT Filed: Oct. 5, 2000
(86) PCT No.: PCT/JP00/06961
§ 371 (c)(1),
(2), (4) Date: Sep. 21, 2001
(87) PCT Pub. No.: WO01/26108
PCT Pub. Date: Apr. 12, 2001

(30) Foreign Application Priority Data

Oct. 7, 1999  (JP) .......................................... P11-287281

(51) Int. Cl.$^7$ .............................................. G11B 33/02
(52) U.S. Cl. ..................................................... 720/647
(58) Field of Search .............................. 369/77.2, 13.2, 369/75.1; 292/216; 70/57, 63, 114, 175

(56) References Cited

U.S. PATENT DOCUMENTS

| | | | | |
|---|---|---|---|---|
| 3,998,482 A | * | 12/1976 | Nozaki et al. | 292/216 |
| 5,557,589 A | * | 9/1996 | Mukawa et al. | 369/13.2 |
| 5,642,344 A | * | 6/1997 | Yamada et al. | 369/77.2 |
| 5,659,530 A | * | 8/1997 | Kurita | 369/77.2 |
| 5,870,367 A | * | 2/1999 | Yamamori | 369/75.1 |

* cited by examiner

Primary Examiner—Tianjie Chen
(74) Attorney, Agent, or Firm—Jay H. Maioli

(57) ABSTRACT

A recording/reproducing device using a magneto-optical disc as a recording medium having a holder for holding a magneto-optical disc and moving the magneto-optical disc between a disc unloading position and a disc loading position, a turntable for rotating the magneto-optical disc, an optical pickup for casting a light beam onto a signal recording surface of the magneto-optical disc, a magnetic head arranged to face the optical pickup on the opposite side of the magneto-optical disc and moving toward and away from the magneto-optical disc, and a rotating ejection lever positioned on a base for ejecting the magneto-optical disc held by the holder. Since the ejection lever is arranged on the side of the base where the optical pickup is arranged, the space within the device body is effectively used, thus realizing miniaturization.

6 Claims, 23 Drawing Sheets ns>
MAGENTO-OPTIC DISC RECORDING AND/OR REPRODUCING DEVICE

TECHNICAL FIELD

This invention relates to a recording and/or reproducing device which uses a magneto-optical disc as a recording medium, and particularly to a magneto-optical disc recording and/or reproducing device which enables miniaturization by realizing effective use of the space and realizes simplification of the mechanism.

BACKGROUND ART

As a magneto-optical disc recording/reproducing device which uses a magneto-optical disc as a recording medium, a device constituted as shown in FIGS. 1 and 2 is conventionally used. In this recording/reproducing device, a rotational driving section 103 for rotationally driving a magneto-optical disc is provided substantially in a center portion of a flat plate-like base 102 arranged inside a device body 101, as shown in FIG. 1. In a portion of the base 102 which extends to one lateral edge from the portion where the rotational driving section 103 is provided, an optical pickup 104 is arranged so as to move away from the rotational driving section 103.

A head attachment arm 105 is arranged on the upper side of a holder provided on the base 102. A magnetic head 106 is attached at the distal end of the head attachment arm 105. The head attachment arm 105 is connected with the optical pickup 104 via a connection member 107 so as to move synchronously with the movement of the optical pickup 104.

On the surface of the side of the base 102 where the holder is provided, an ejection lever 108 for ejecting a disc cartridge held by the holder is provided. The ejection lever 108 is provided at a position on the opposite side to the portion where the optical pickup 104 is provided, with the rotational driving section 103 provided between them, as shown in FIG. 1.

In the recording/reproducing device shown in FIG. 1, a battery housing section 110 for housing a battery 109 is provided inside the device body 101. The battery housing section 110 is provided on the back side of the base 102 where the ejection lever 108 is arranged.

Meanwhile, if miniaturization of the magneto-optical disc recording/reproducing device is to be realized, the housing position of the battery 109 must be considered. For example, for realizing the miniaturization of the recording/reproducing device, it may be considered to arrange the battery housing section 110 at a position facing the optical pickup 104 so that the rotational driving section 103 provided between them, as shown in FIG. 3. If the battery housing section 110 is arranged in this manner, the ejection lever 108 used in the device shown in FIG. 1 cannot be arranged.

Thus, it may be considered to provide the ejection lever 108 on the side where the optical pickup 104 is arranged. If the ejection lever 108 is arranged in this manner, there is a risk that the ejection lever 108 may interfere with the connection member 107. To avoid this interference, the connection member 107 must be allowed to escape toward the rear side of the base 102 and the device itself is increased in size for that space.

In the recording/reproducing device using a magneto-optical disc as a recording medium, the optical pickup and the magnetic head are arranged so that the magneto-optical disc is provided between them. The magnetic head is arranged to be in contact with or close to the surface of the magneto-optical disc that is opposite to the surface irradiated with a light beam emitted from the optical pickup.

The magnetic head used in the magneto-optical disc recording/reproducing device is moved to a position in contact with or close to the magneto-optical disc only at the time of recording, and is moved to a position away from the magneto-optical disc at the time of reproduction. This is to prevent the magnetic head and the magneto-optical disc from constantly contacting each other so as to protect the magnetic head and the magneto-optical disc.

Thus, in the magneto-optical disc recording/reproducing device, a head lift mechanism as shown in FIG. 4 is provided for moving the magnetic head toward and away from the magneto-optical disc.

The magneto-optical disc recording/reproducing device having the head lift mechanism will now be described. This device has a holder 123 which holds a disc cartridge constituted by a rectangular cartridge body with a magneto-optical disc 121 housed therein and which is arranged movably between a first position for loading the disc cartridge at a disc loading position formed on a base 122 and a second position for carrying out loading and release of the disc cartridge, as shown in FIG. 4.

A magnetic head unit 125 moving toward and away from the magneto-optical disc 121 housed in the disc cartridge is connected to an optical pickup, not shown, via a connection member 126, and is supported to be movable synchronously with the optical pickup in the direction of an arrow X in FIG. 4, which is the radial direction of the magneto-optical disc 121. The magnetic head unit 125 has ahead support arm 128 supporting a magnetic head 127 at the distal end, and an arm support plate 129 for regulating excessive displacement of the head support arm 128. The head support arm 128 is formed by punching out an elastic thin metal plate such as phosphor bronze. A distal end portion 129a bent into an L-shape, of the arm support plate 129, supports the lower surface on the distal end side of the head support arm 128, and the proximal end portions of the arm support plate 129 and the head support arm 128 are fixed and supported on a U-shaped upper end portion of the connection member 126.

The magnetic head 127 is raised and lowered by a head shift plate 130. The head shift plate 130 is formed in a substantially rectangular plate shape and has its rear end portion supported in a vertically rotatable manner near a rear end portion of an aperture 123a provided in the holder 123. On the head shift plate 130, a driven piece 131 protruding from one lateral edge of the head shift plate 130 and a spring abutment piece 132 protruding the other lateral edge are provided. The head shift plate 130 is pressured and supported downward on the side of the holder 123 by a return spring 133. The return spring 133 has its one end fixed to the top plate of the holder 123 and its other end pressures the spring abutment piece 132 of the head shift plate 130 from above, thus biasing the head shift plate 130 downward. The driven piece 131 of the head shift plate 130 is located above a cam piece 136 of a head lift lever 135 which is rotatably supported to the top plate of the holder 123. The cam piece 136 has a lowering portion formed at the rear end and a rising portion formed at the front end, and the lowering portion and the rising portion are connected by a sloped portion.

FIG. 4 shows the state where the driven piece 131 is set on the lowering portion of the cam piece 136 in the magneto-optical disc recording/reproducing device. In the state shown in FIG. 4, the head shift plate 130 is rotated downward, the magnetic head unit 125 is rotated downward, and the magnetic head 127 is moved to a position in contact with or close to the magneto-optical disc 121 housed in the disc cartridge held by the holder 123.

On the base 122 on which the holder 123 holding the disc cartridge inserted therein is rotatably supported, a lift control plate 137 is supported to be movable in the back-and-forth direction, that is, forward in the direction of an arrow Y and backward in the direction of an arrow Z in FIG. 4. A rack 138 is formed on the lift control plate 137. The rack 138 is moved and operated in the back-and-forth direction via a connection gear mechanism 142 rotated by a driving motor 141. A connection hole 143 is formed at the rear end portion of the lift control plate 137. In the connection hole 143, a connection piece 144 provided at the other end of the head lift lever 135 is inserted.

If the lift control plate 137 moves forward in the direction of the arrow Y in FIG. 4, the head lift lever 135 rotates counterclockwise in FIG. 4. If the lift control plate 137 moves backward in the direction of the arrow Z in FIG. 4, the head lift lever 135 rotates clockwise in FIG. 4.

The magneto-optical disc recording/reproducing device in the state of FIG. 4 is in a recordable state for recording information signals onto the magneto-optical disc 121 as described above. The lift control plate 137 is moved rearward in the direction of the arrow Z in FIG. 4 and the head lift lever 135 is rotated clockwise in FIG. 4, so that the magnetic head 127 is located in the lowest state with respect to the holder 123. In this state, the magnetic head 127 is in contact with the magneto-optical disc 121.

On completion of recording of information signals onto the magneto-optical disc 121, the lift control plate 137 is moved forward in the direction of the arrow Y in FIG. 4 and the head lift lever 135 is rotated counterclockwise in FIG. 4. The cam piece 136 is moved rearward and the driven piece 131 of the head shift plate 130 is located on the rising portion of the cam piece 136. The head shift plate 130 is rotated upward and the support arm 128 is lifted up to rotate upward. As a result, the magnetic head 127 moves away from the magneto-optical disc 121.

In the magneto-optical disc recording/reproducing device shown in FIG. 4, since the head lift lever 135 is provided between the lift control plate 137 and the head shift plate 130 in order to rotate the head shift plate 130, a large number of components and connection parts are required. Therefore, it is difficult to assemble the device and realize the position accuracy of the connection parts. Moreover, the magneto-optical disc recording/reproducing device has a poor power transmission efficiency and lacks reliability. In addition, it is necessary to arrange the members for power transmission over a long distance like the lift control plate 137 extending in the back-and-forth direction over the base 122, the connection piece 144 of the head lift lever 135 extending in the up-and-down direction at one lateral portion, and the head lift lever 135 extending in the right-and-left direction on the upper side of the holder 123. Therefore, these members occupy a large area on the base 122, making it difficult to arrange other members.

Thus, it may be considered to provide a cam member moving in the back-and-forth direction on the lateral side of the base 122 and to drive a cam follower protruding toward the lateral side from the head lift lever 135 by using the cam member so as to raise and lower the head lift lever 135 and hence the magnetic head 127. In the case where such a structure is employed, when the holder 123 is moved to a disc cartridge unloading position above the base 122, the cam follower of the head lift lever 135 is moved away from the cam member provided on the base 122. Therefore, the magnetic head 127 is lowered and there is a risk that the magnetic head 127 may be damaged by insertion and ejection of the disc cartridge with respect to the holder 123.

In the cartridge body of the disc cartridge housing the magneto-optical disc therein, a recording/reproduction aperture is provided for exposing a part of the magneto-optical disc to the outside from the innermost circle to the outermost circle. This aperture is normally closed by a shutter member movably provided on the cartridge body. The shutter member is moved to a position for opening the aperture when the disc cartridge is inserted to a predetermined position in the holder. A shutter opening member for moving the shutter member to release the aperture provided in the cartridge body is formed by cutting, raising and bending a part of the holder 123.

Since the holder in which the disc cartridge is inserted and held is normally formed by bending and processing a thin metal plate, an edge is formed on a peripheral edge portion of the shutter opening member formed by cutting, raising and bending a part of the holder. As the disc cartridge is normally inserted into and ejected from the holder by an operator's hand, the disc cartridge is inserted at various angles into the holder. Therefore, depending on the direction of insertion of the disc cartridge into the holder, the inner surface of the groove which the shutter opening member provided on the disc cartridge enters may be shaven off by the edge generated on the peripheral edge portion of the shutter opening member.

In the recording/reproducing device using a magneto-optical disc as a recording medium, when the recording operation mode is selected and at least recording of information signals onto the magneto-optical disc is being carried out, it is necessary to prohibit the operation of ejecting the disc cartridge and the operation of releasing a cover body having a disc cartridge holding portion for opening and closing the device body.

Specifically, the recording/reproducing device using a magneto-optical disc as a recording medium is constituted so as to end the recording operation after recording all of desired information signals and reference information called TOC (table of contents) onto the disc. In the case of reproducing information signals recorded on the magneto-optical disc, the recording/reproducing device finds out TOC information and carries out reproduction of the information signals recorded on the basis of the TOC information. Therefore, if the TOC information is not recorded when recording the information signals, reproduction of the information recorded on the magneto-optical disc cannot be carried out. Thus, in the magneto-optical disc recording/reproducing device, when the operator presses a stop button at the end of recording, recording of information signals is stopped and then the operation of writing TOC information is carried out.

In the magneto-optical disc recording/reproducing device thus constituted, when the recording operation mode is selected and at least recording of information signals onto the magneto-optical disc is being carried out, if the operation of ejecting the disc cartridge or the operation of releasing the cover body for opening and closing the device body is carried out to cause the driven portion to fall into a stopped state, the recording operation is interrupted before the stop button is pressed. Since TOC information is not written, the information that is recorded until then cannot be reproduced.

To solve such a problem, in the magneto-optical disc recording/reproducing device, there is provided a mechanism for prohibiting the operation of ejecting the disc cartridge and the operation of releasing the cover body for opening and closing the device body when at least recording of information signals onto the magneto-optical disc is being carried out.

As such a mechanism for prohibiting the operation of ejecting the disc cartridge and the operation of releasing the cover body for opening and closing the device body, a mechanism as shown in FIGS. 5A, 5B and 5C is used.

In the mechanism shown in FIGS. 5A to 5C, in addition to a lock lever 151 which moves between a locking position for locking at a closing position the cover body for opening/closing the device body and an unlocking position for canceling the locking of the cover body at the closing position, there is provided regulating means 152 which moves between a regulating position for preventing the lock lever 151 from moving to the unlocking position and a non-regulating position for permitting the lock lever 151 to move to the unlocking position, as shown in FIG. 5A. At the time of reproduction or stop, the regulating means 152 is located at the non-regulating position shown in FIG. 5B, thus permitting the lock lever 151 to move to the unlocking position shown in FIG. 5B. At the time of recording, the regulating means 152 is located at the regulating position shown in FIG. 5C, thus preventing the lock lever 151 from moving to the unlocking position.

Meanwhile, in the mechanism shown in FIGS. 5A to 5C, when the operator erroneously operates to move the lock lever 151 to the unlocking position at the time of recording, a part of the lock lever 151 is engaged with the regulating means 152 to prevent movement to the unlocking position. The operator experiences a strong shock-like feeling and an uncomfortable touch. Also, since an operating section 153 integral with the lock lever 151 which is operated by the operator does not move, the operator may misunderstand the situation and try to move the operating section 153 forcibly, thus breaking the operating section 153 or the lock lever 151.

DISCLOSURE OF THE INVENTION

Thus, it is an object of the present invention to provide a new recording and/or reproducing device which enables further miniaturization of a recording/reproducing device using a magneto-optical disc as a recording medium.

It is another object of the present invention to provide a recording and/or reproducing device which enabling further miniaturization of the device itself by realizing efficient use of the space without causing any interference of the ejection lever with the other members even when the ejection lever is arranged on the side where the optical pickup is arranged.

It is still another object of the present invention to provide a recording and/or reproducing device which enables realization of simplification of the mechanism and realization of protection of the magnetic head.

It is still another object of the present invention to provide a recording and/or reproducing device which enables prevention of damage to the disc cartridge by using the shutter opening member.

It is a further object of the present invention to provide a recording and/or reproducing device which enables secure prevention of damage due to a forcible operation, without generating any uncomfortable feeling to the operator even if the operator carries out the unlocking operation when unlocking of the cover body for opening/closing the device body is prohibited.

In order to achieve the above-described objects, a magneto-optical disc recording/reproducing device according to the present invention comprises: a holder rotatably provided on a base for holding a magneto-optical disc inserted therein and for moving between a disc unloading position and a disc loading position; a turntable provided on the base for rotationally driving the magneto-optical disc held and moved to the disc loading position by the holder; an optical pickup movably provided on the base for casting a light beam onto a signal recording surface of the rotationally driven magneto-optical disc; a magnetic head arranged to face the optical pickup on the opposite sides of the magneto-optical disc and movable between a recording position in contact with or close to the magneto-optical disc and a non-recording position away from the magneto-optical disc; a connection member for connecting the optical pickup and the magnetic head; and an ejection lever rotatably provided on the base and biased into a direction of pressuring and ejecting, by a pressuring portion, the magneto-optical disc held by the holder. The ejection lever is arranged on the periphery of the optical pickup. A main portion of the ejection lever is provided along the base surface and the locus of rotation of the ejection lever and the locus of movement of the connection member are different from each other.

Also, a magneto-optical disc recording/reproducing device according to the present invention comprises: a holder rotatably provided on a base for holding a magneto-optical disc inserted therein and for moving between a disc unloading position and a disc loading position; a turntable provided on the base for rotationally driving the magneto-optical disc held and moved to the disc loading position by the holder; an optical pickup movably provided on the base for casting a light beam onto a signal recording surface of the rotationally driven magneto-optical disc; a head moving member supported by the optical pickup and arranged to face the optical pickup on the opposite sides of the magneto-optical disc for pressuring a magnetic head to move between a recording position in contact with or close to the magneto-optical disc and a non-recording position away from the magneto-optical disc; and biasing means for biasing the head moving member into a direction of moving away from the magneto-optical disc.

The magneto-optical disc recording/reproducing device according to the present invention further comprises a shutter opening mechanism having a tongue-like shutter opening member which is engaged with a shutter member for opening/closing an aperture for recording/reproduction provided in the cartridge in accordance with insertion of a storage medium cartridge having a storage medium housed in the cartridge to a predetermined position and thus pressures the shutter member into all opening direction, the shutter opening mechanism being provided in such a manner that a protruding portion having a curved surface protrudes from at least one of major surfaces of the shutter opening member.

The magneto-optical disc recording/reproducing device according to the present invention further comprises a cover body lock mechanism which comprises: a lock lever for moving between a locking position for locking at a closing position a cover body for opening/closing the device body and an unlocking position for canceling the locking of the cover body; a regulating member for moving between a regulating position for regulating movement of the lock lever to the unlocking position and a non-regulating position for permitting movement of the lock lever to the unlocking position; first biasing means for biasing the lock lever toward the locking position; and second biasing means for connecting the lock lever and an operating section with each other and biasing the lock lever into the same direction as the direction toward the locking position, the second biasing means having a greater biasing force than the first biasing means.

Other objects and specific advantages of the present invention will be further clarified from the description of the following embodiment.

BEST MODE FOR CARRYING OUT THE INVENTION

An embodiment in which the present invention is applied to a magneto-optical disc recording/reproducing device will now be described.

Figure 7:
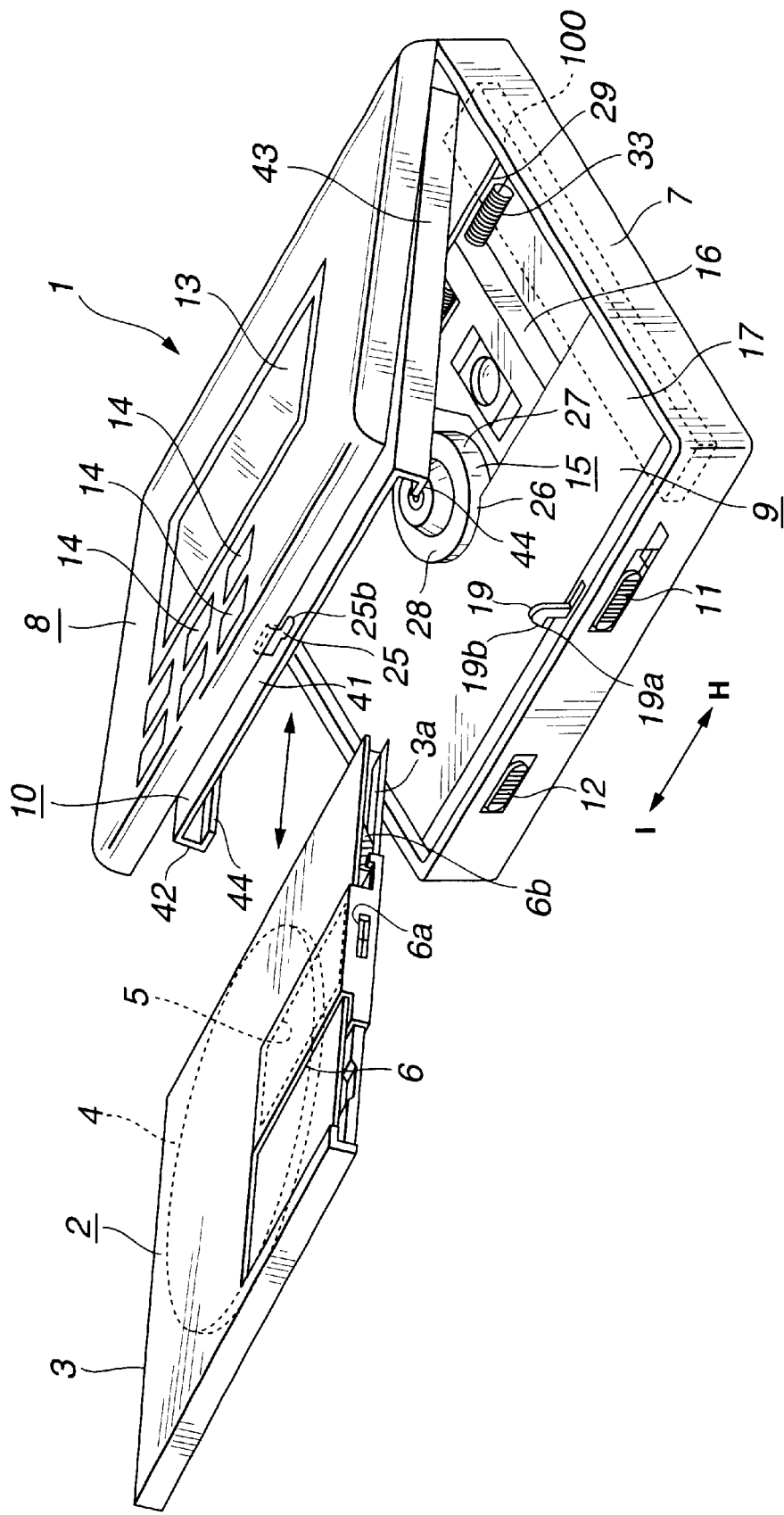
FIG. 7 is a perspective view showing the magneto-optical disc recording/reproducing device together with a disc cartridge in the state where the cover body is moved to an opening position.

A disc cartridge 2 used in a magneto-optical disc recording/reproducing device 1 of the present invention will be first described. The disc cartridge 2 has a flat rectangular cartridge case 3 and has a magneto-optical disc 4 rotatably housed in the case 3, as shown in FIG. 7. At a center portion on the lower side of the cartridge case 3 having the magneto-optical disc 4 housed therein, a center hole for exposing a disc hub, not shown, attached at a center portion of the housed magneto-optical disc 4 is formed. Also, on the lower side of the cartridge case 3, a pickup access hole for causing the signal recording surface of the magneto-optical disc 4 to face an optical pickup is formed. At the position facing the pickup access hole on the upper side of the cartridge case 3, a head access hole 5 is formed for causing a magnetic head for recording signals, which will be described later, to enter the cartridge case 3 and contact the magneto-optical disc 4.

Moreover, a shutter member 6 for opening/closing the pickup access hole and the head access hole 5 is movably attached on the cartridge case 3, as shown in FIG. 7. The shutter member 6 moves on the cartridge case 3 between a closing position for closing the pickup access hole and the head access hole 5 and an opening position for opening the pickup access hole and the head access hole 5. An engagement hole 6a is formed in a portion of the shutter member 6 facing the front end surface of the cartridge case 3, and a groove 3a which a shutter opening member enters is formed on the front end surface of the cartridge case 3 facing the portion of the shutter member 6 where the engagement hole 6a is formed. A pressured portion 6b of a lock member for locking the shutter member 6 at the closing position is located in the groove 3a (see FIG. 7).

Figure 1:
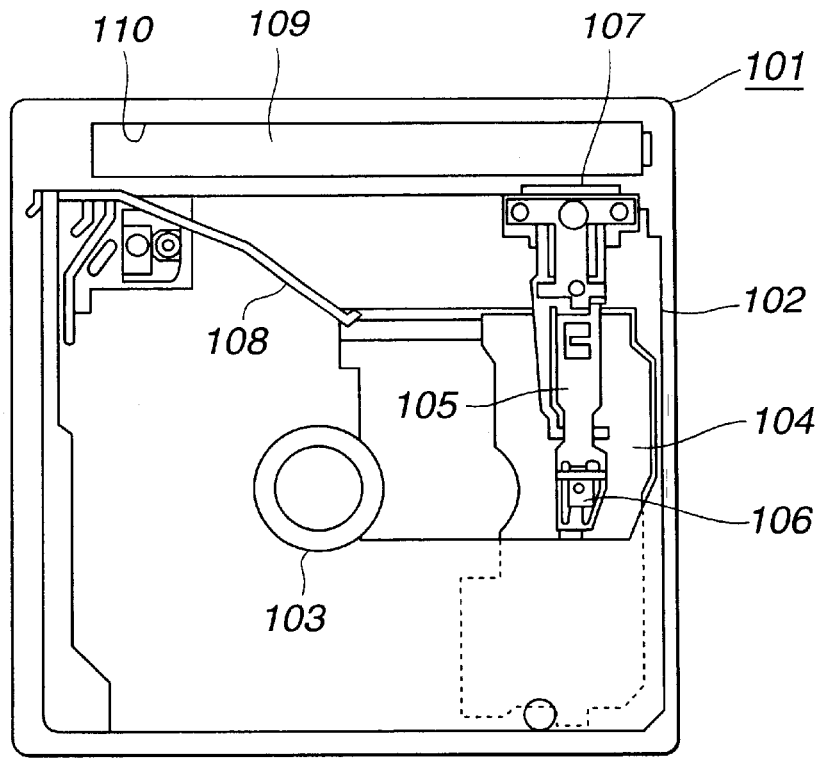
FIG. 1 is a plan view showing a conventional magneto-optical disc recording/reproducing device.
Figure 2:
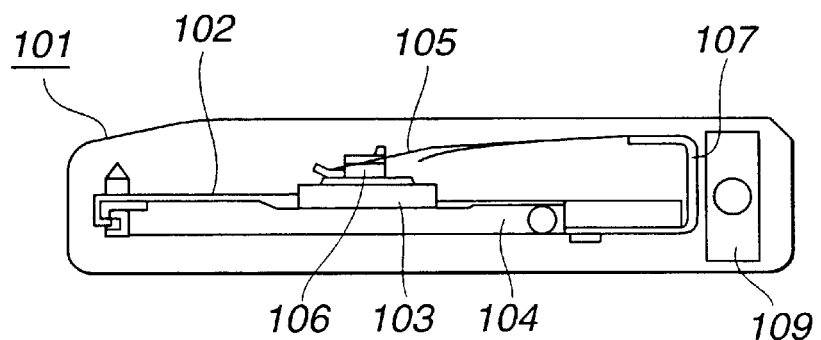
FIG. 2 is a side view showing the conventional magneto-optical disc recording/reproducing device.
Figure 3:
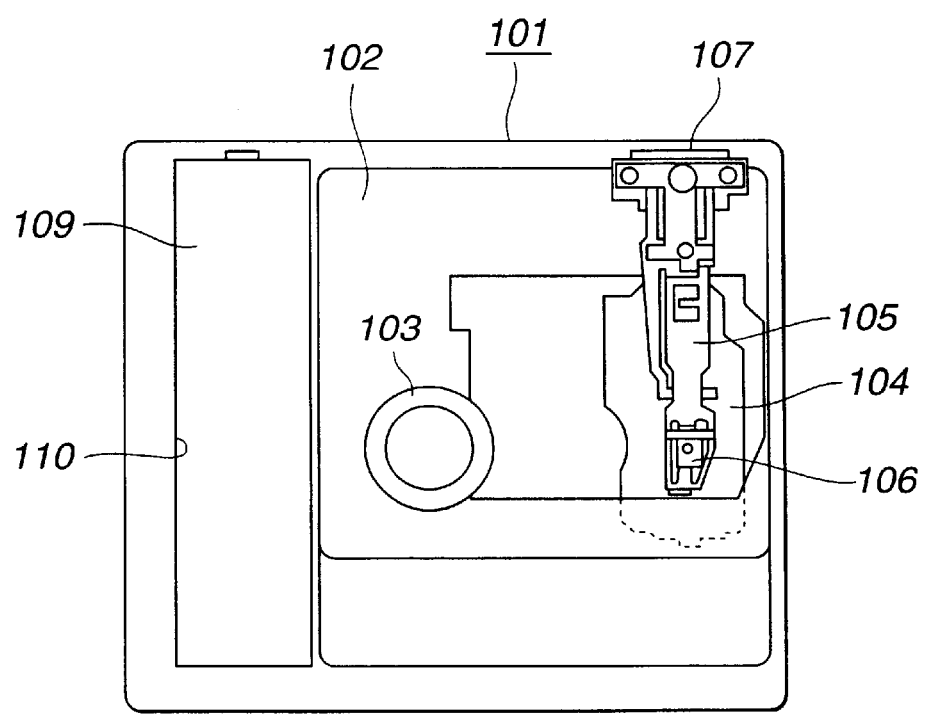
FIG. 3 is a plan view showing the magneto-optical disc recording/reproducing device such that a battery is housed on the outer side of a base.
Figure 4:
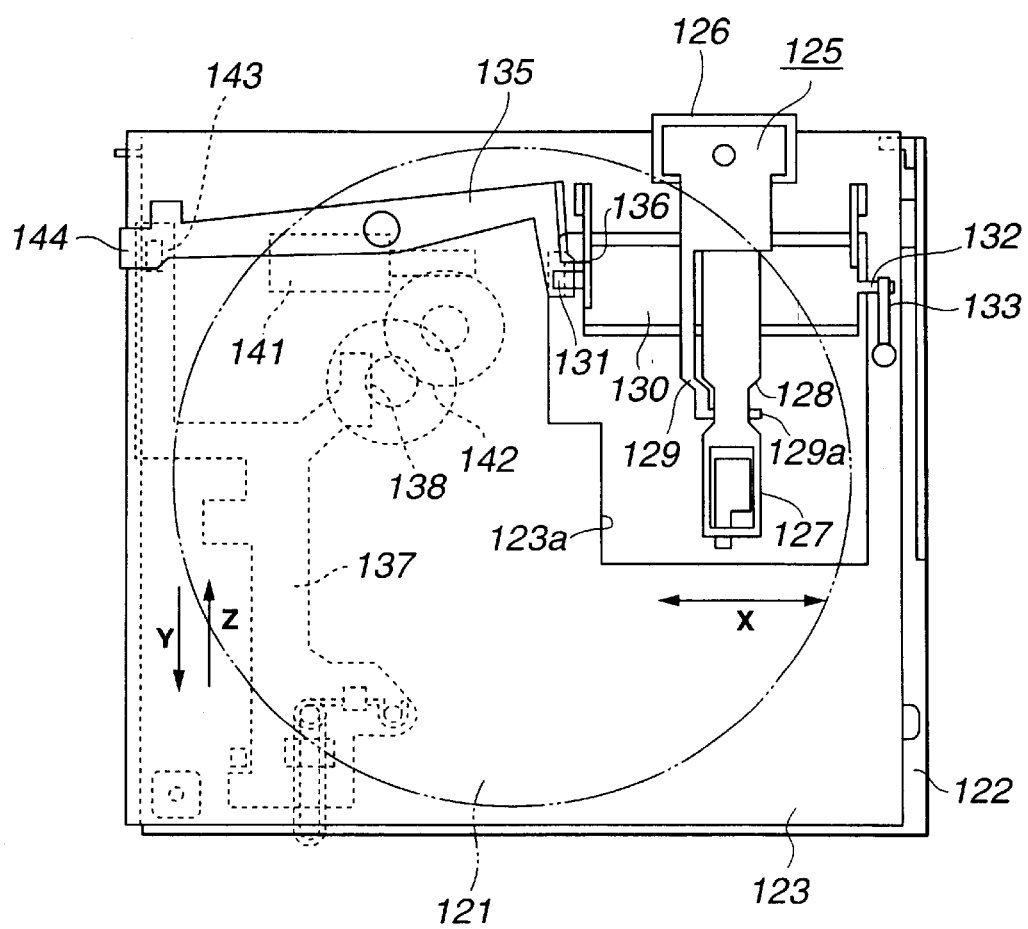
FIG. 4 is a plan view showing the conventional magneto-optical disc recording/reproducing device.
Figure 5A:
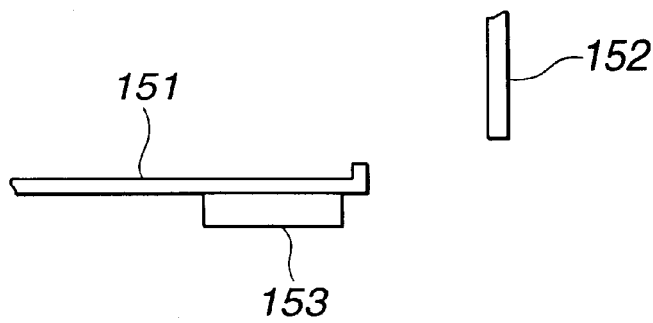
FIG. 5A shows the positional relation between a lock lever and regulating means at the time of reproduction or stop.
Figure 5B:
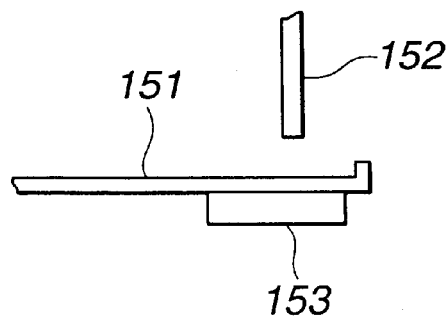
FIG. 5B shows the state where the lock lever is moved to an unlocking position at the tine of reproduction or stop.
Figure 5C:
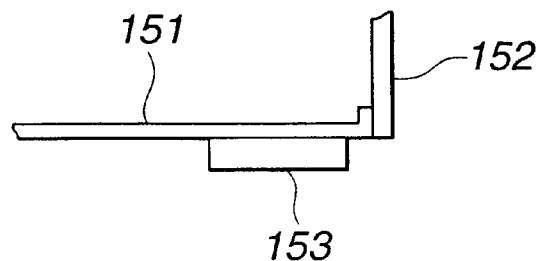
FIG. 5C shows the state where the lock lever is prevented from moving to the unlocking position by the regulating means at the time of recording.
Figure 6:
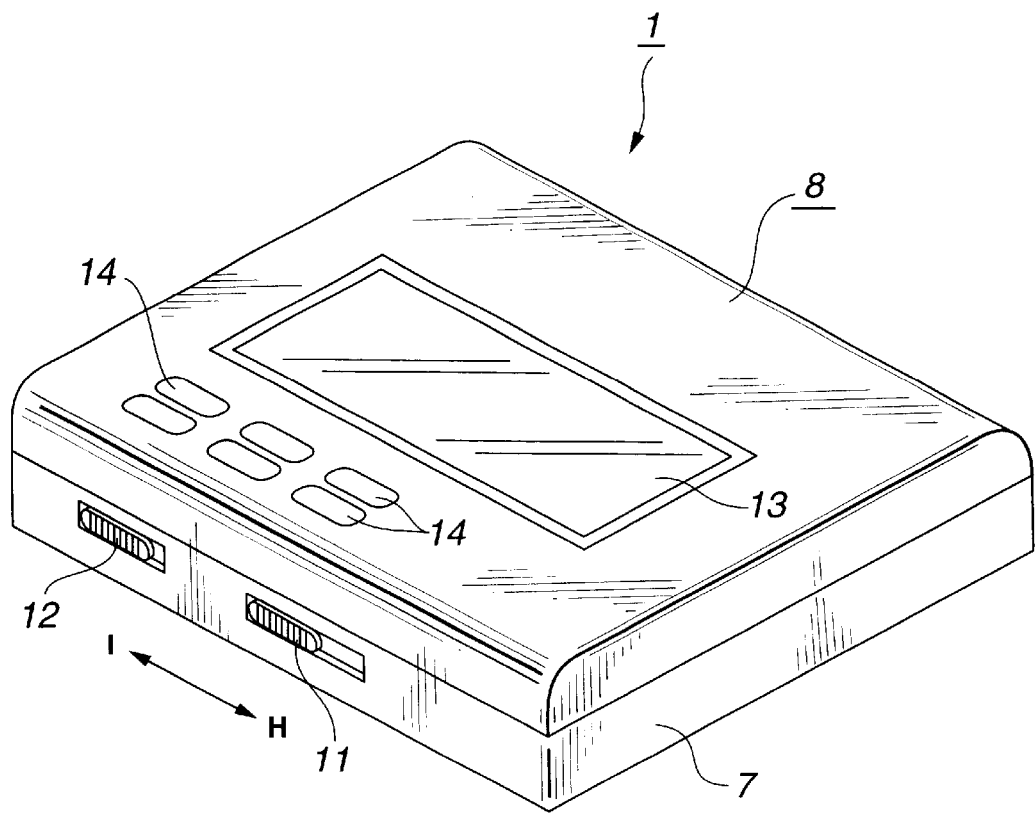
FIG. 6 is a perspective view showing the appearance of a magneto-optical disc recording/reproducing device and showing the state where a cover body for opening/closing the device body is at a closing position.

The magneto-optical disc recording/reproducing device 1 according to the present invention using the disc cartridge 2 as a recording medium as described above is constituted so that a driving section 9 and a holder 10 are provided inside a device body constituted by a thin box-shaped body case 7 with its upper side open and a cover body 8 rotatably provided on the body case 7 for opening/closing the upper side of the body case 7, as shown in FIGS. 6 and 7. The holder 10 moves between a loading position for holding the disc cartridge 2 and loading the magneto-optical disc 4 onto a disc loading section constituted on the driving section 9 and an unloading position for moving away from the disc loading section and unloading the disc cartridge 2.

On the front surface of the body case 7, an opening operation knob 11 for carrying out the operation of opening the cover body 8 and a recording operation knob 12 are provided, as shown in FIGS. 6 and 7. When the opening operation knob 11 is moved into the direction of an arrow H in FIGS. 6 and 7, it cancels the locking of the cover body 8 at the closing position for closing the upper side of the body case 7. As the recording operation knob 12 is moved into the direction of the arrow H in FIGS. 6 and 7, it selects an operation mode for recording information signals onto the magneto-optical disc 4. Moreover, a liquid crystal display section 13 and various operation buttons 14, 14, . . . are provided on the upper side of the cover body 8.

Figure 8:
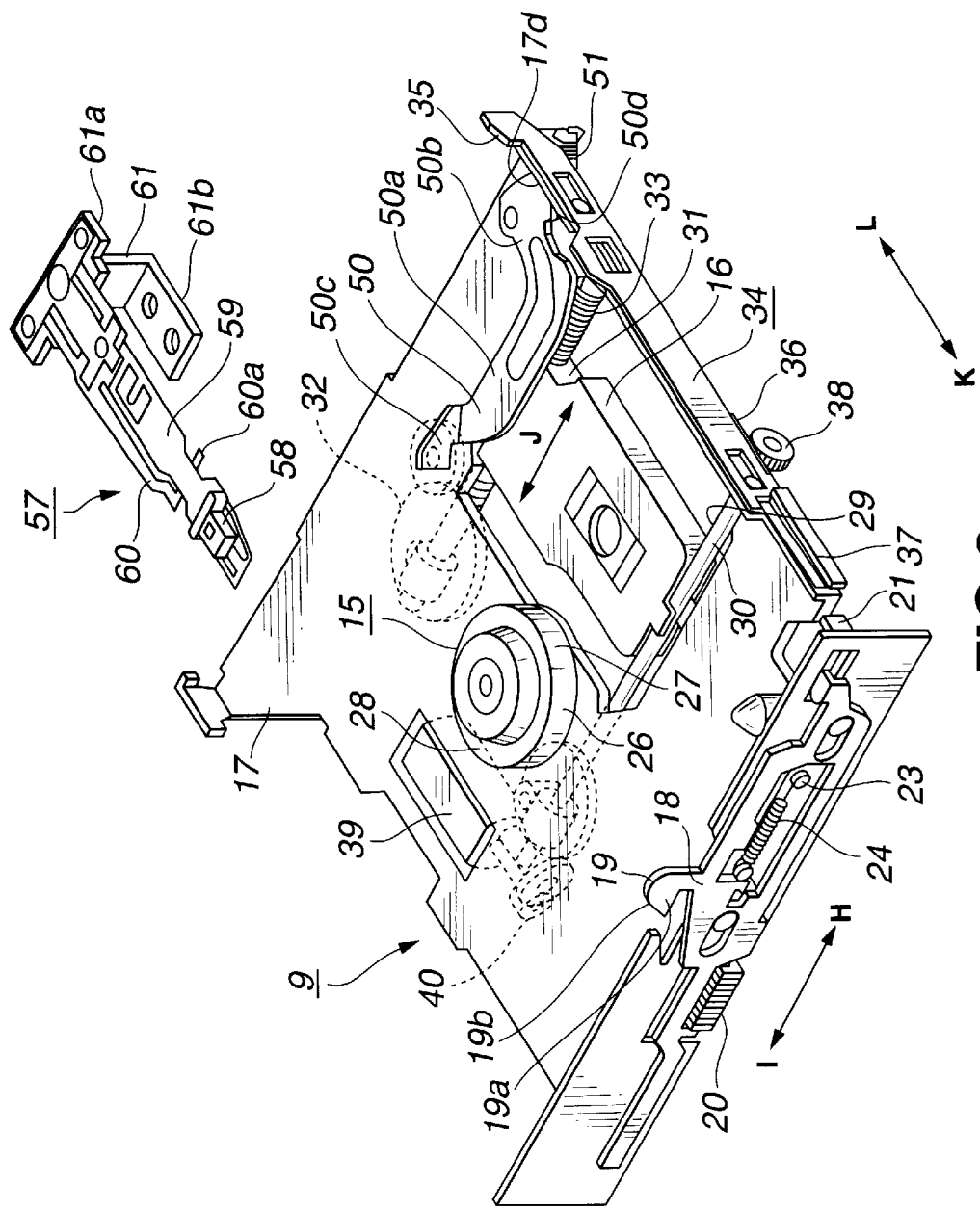
FIG. 8 is a perspective view showing the internal mechanism of the magneto-optical disc recording/reproducing device.

The driving section 9 has a flat plate-like base 17, and a rotational driving section 15 for rotationally driving the magneto-optical disc 4 and an optical pickup 16 for casing a laser beam onto the signal recording surface of the magneto-optical disc so as to reproduce or record signals are mounted on the base 17, as shown in FIG. 8.

On the front side of the base 17, a lock lever 18 is supported to be movable in the right-and-left directions, that is, in the directions of the arrows H and I in FIG. 8. A lock pawl 19 is provided to protrude upward on the upper edge of the lock lever 18, as shown in FIGS. 7 to 10. The lock pawl 19 has a pawl portion 19a which is protruding leftward in FIG. 8, as viewed from the front side and which has an inclined edge 19b with its left side down. A compressed coil spring 20 is provided between the lock lever 18 and the base 17, and the lever 18 is biased leftward, that is, in the direction of the arrow I in FIG. 8, by the compressed coil spring 20. A regulated portion 21 is provided to protrude rearward from the upper edge of the right end portion of the lock lever 18 shown in FIG. 8, and a switch pressing piece 22 is provided to protrude rearward from the left end portion of the lock lever 18, as shown in FIG. 10.

Figure 9:
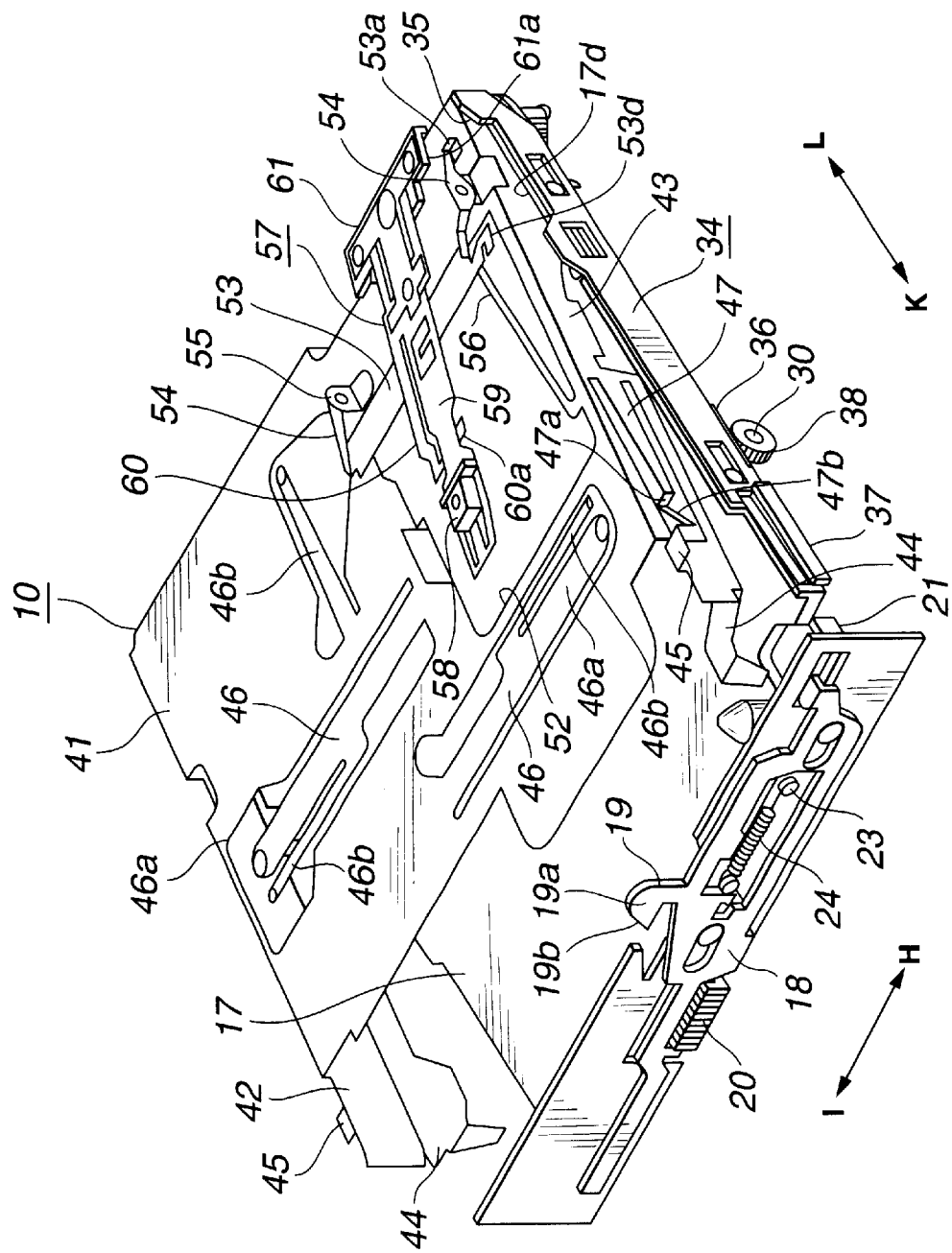
FIG. 9 is a perspective view showing the internal mechanism of the magneto-optical disc recording/reproducing device together with a holder.
Figure 10:
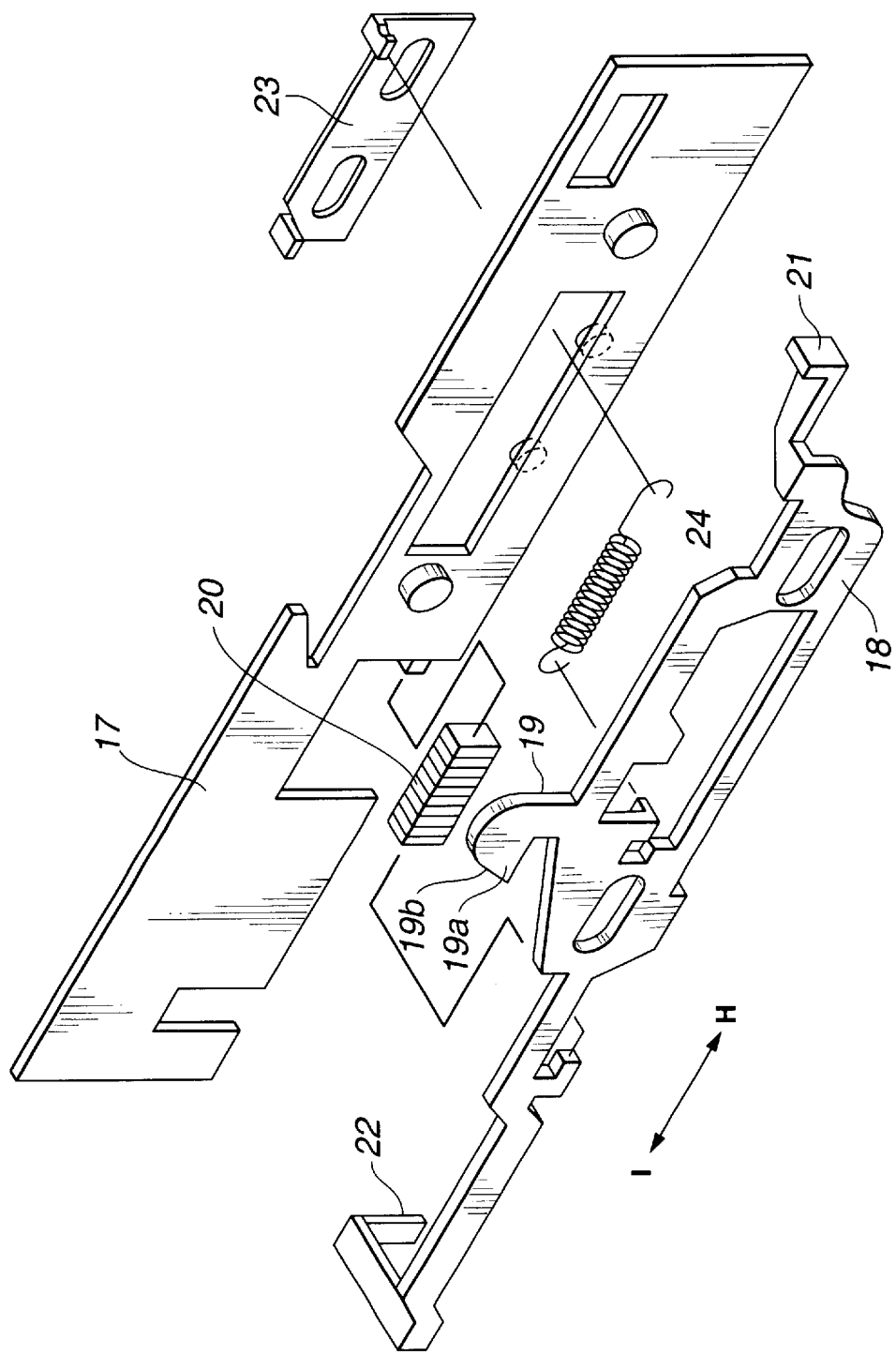
FIG. 10 is an exploded perspective view showing a mechanism for locking the cover body to the device body.

On the front side of the base 17, an opening operation lever 23 connected with the opening operation knob 11 is supported to be movable in the right-and-left directions, that is, in the directions of the arrows H and I in FIGS. 8 to 10. The opening operation lever 23 is connected to the lock lever 18 via a tension spring 24, as shown in FIGS. 8 to 10. As this tension spring 24, a spring having a large tensility than the expansibility of the compressed coil spring 20 is used. Therefore, when a force into the direction of the arrow H in FIGS. 8 to 10 is not applied to the opening operation knob 11, the opening operation lever 23 and the opening operation knob 11 are located on the left end side of the movement range by the expansibility of the compressed coil spring 20.

Figure 17:
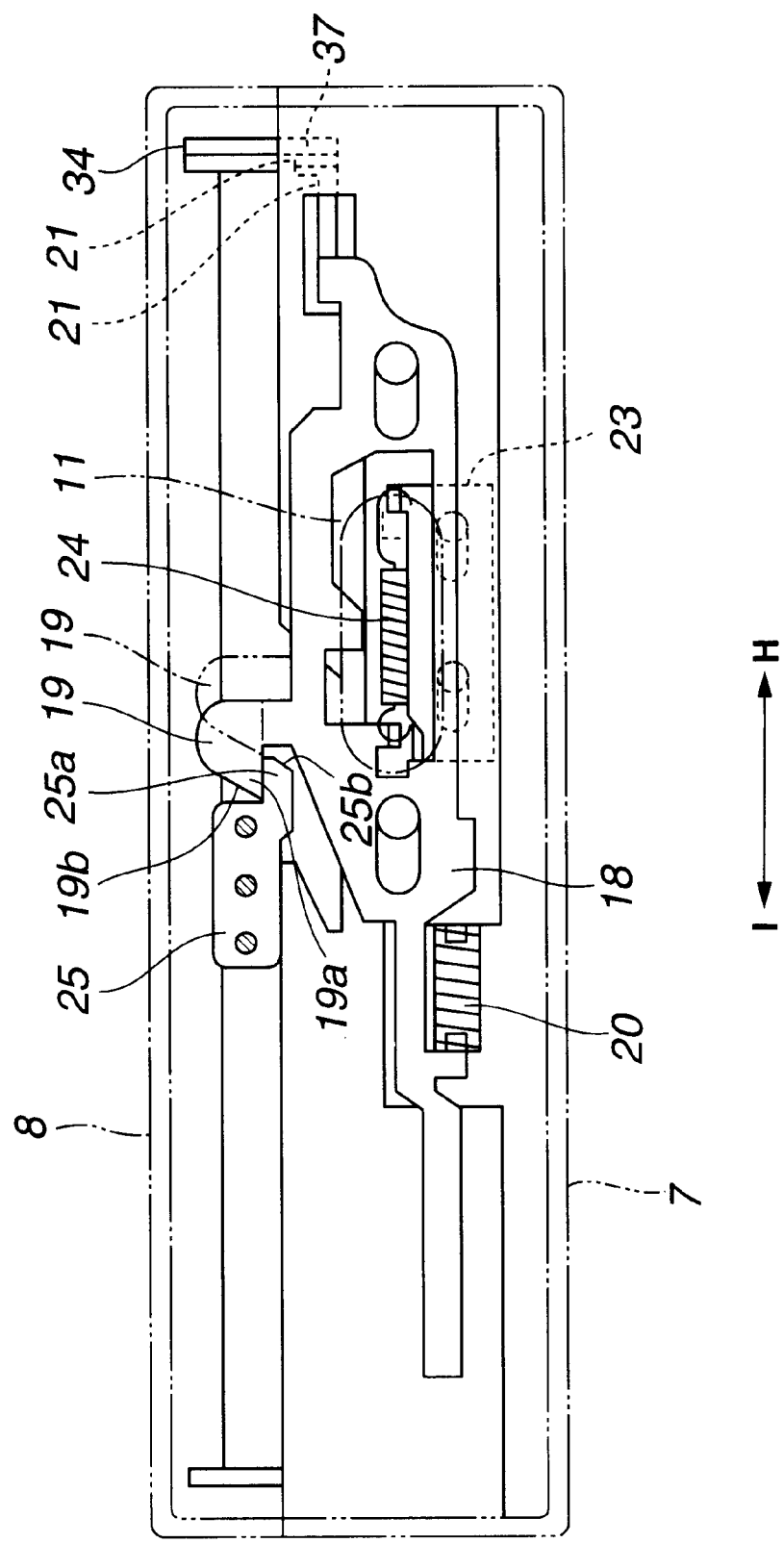
FIG. 17 is a schematic front view showing a mechanism section and the cover body.
Figure 18:
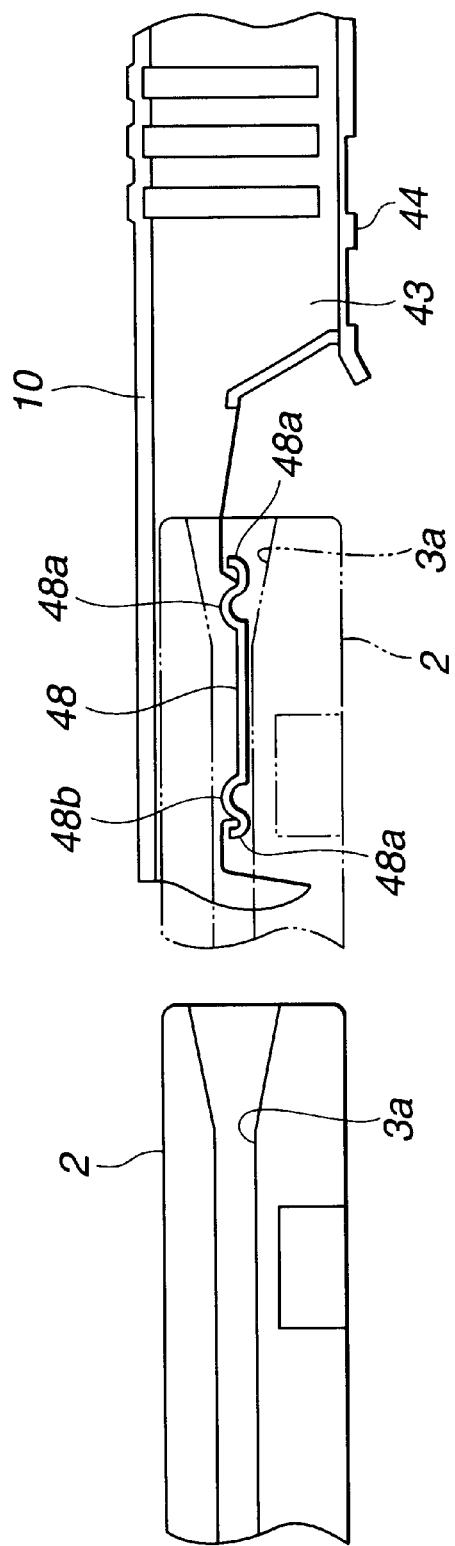
FIG. 18 is an enlarged cross-sectional view showing the shutter opening member together with a part of the disc cartridge.

On the inner surface of the front end portion of the cover body 8 rotatably attached on the body case 7, an engagement member 25 is attached as shown in FIGS. 7 and 17. A retaining portion 25a protruding rightward, as viewed from the front side in FIG. 17, is formed on the engagement member 25. The distal end surface of the retaining portion 25a is an inclined portion 25b with its left side down in FIG. 17.

At center portion of the base 17 constituting the driving section 9, a spindle motor 26 is supported as shown in FIGS. 7 and 8. An upper side portion 28 of a rotor 27 of the spindle motor 26 is a turntable and the center portion of the magneto-optical disc 4 is set on the turntable 28. The rotational driving section 15 is constituted by the spindle motor 26 and the turntable 28.

Figure 12:
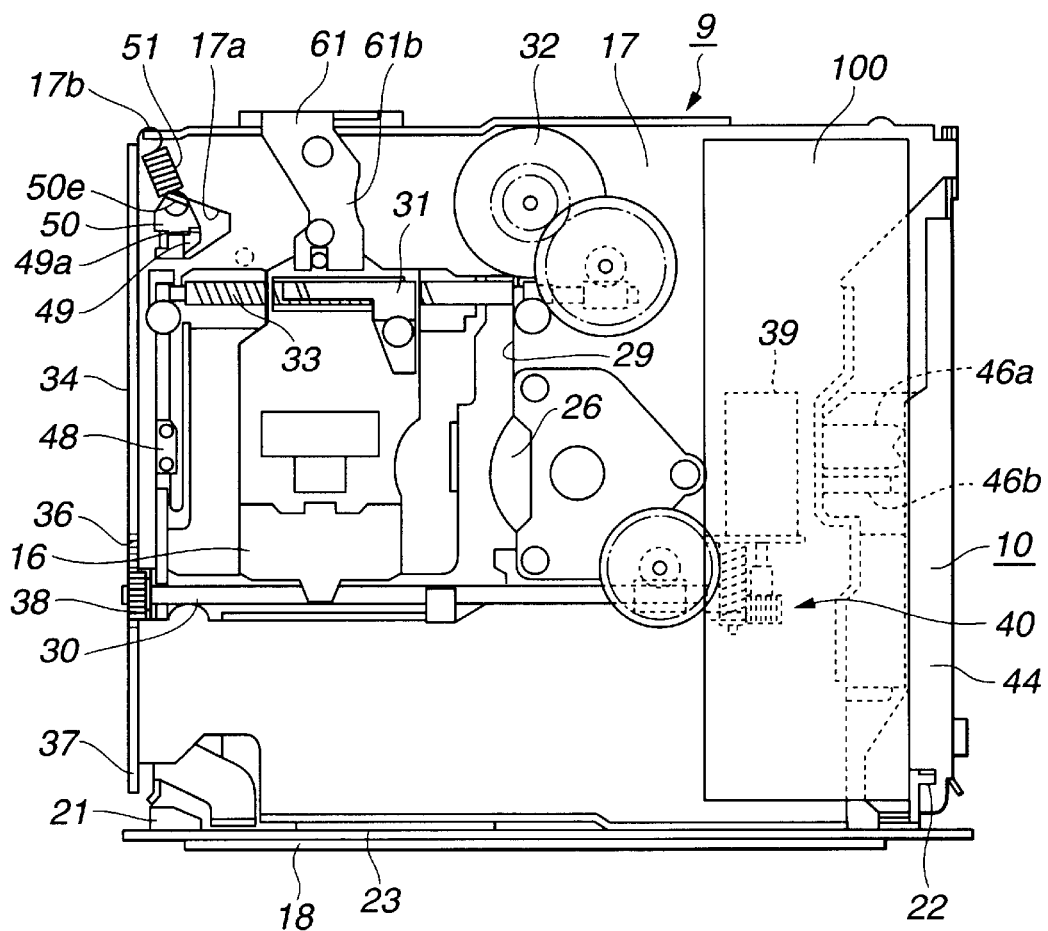
FIG. 12 is a bottom view showing the internal mechanism of the magneto-optical disc recording/reproducing device.

A large aperture 29 is formed on one lateral edge from the portion of the base 17 where the rotational driving section 15 is arranged, that is, from the center portion to the right lateral edge in FIG. 8. The optical pickup 16, exposed upward from the aperture 29, is movable into the directions toward and away from the rotational driving section 15, that is, in the directions of an arrow J in FIG. 8. The optical pickup 16 has its one end portion slidably supported on a guide shaft 30 provided on the lower side of the base 17, and a nut portion 31 provided on its other end portion is engaged with a lead screw 33 rotated by a feed motor 32, as shown in FIG. 12. As the lead screw 32 is rotated by driving of the feed motor 32 and the nut portion 31 engaged with the lead screw 33 is fed into the axial direction of the lead screw 33, the optical pickup 16 is moved into the directions of the arrow J in FIG. 8.

On the right lateral side of the base 17 shown in FIGS. 8 and 9, a control lever 34 is supported to movable in the back-and-forth direction. An inclined cam edge 35 with its front side down is formed on the upper edge of a rear end portion of the control lever 34. A rack 36 is formed on the lower edge of a portion close to the front end of the control lever 34. Moreover, a regulating portion 37 is provided on a front end portion of the control lever.

One end portion of the guide shaft 30 supporting the optical pickup 16 protrudes from the right end of the base 17 shown in FIG. 8, and a pinion 38 is attached to the protruding portion. The pinion 38 is meshed with the rack 36 of the control lever 34, as shown in FIGS. 8, 9 and 12. A control motor 39 is attached on the lower side of the base 17. The control motor 39 and the guide shaft 30 are connected with each other by a transmission gear array 40, and the guide shaft 30 is rotated by driving of the control motor 39.

When the recording operation knob 12 is operated by a user into the direction of the arrow H in FIG. 6 so as to select a recording operation mode, the rack 36 is moved by the pinion 38 rotated by driving of the control motor 39 and the control lever 34 is moved forward, that is, into the direction of an arrow K in FIGS. 8 and 9 toward a recording position at the front end of the movement range.

On completion of the operation of recording information signals onto the magneto-optical disc 4, the pinion 38 is rotated in the direction opposite to the direction in the case of selecting the recording operation mode, by driving of the control motor 39, and the rack 36 is moved by the pinion 38. Thus, the control lever 34 is moved rearward, that is, into the direction of an arrow L in FIGS. 8 and 9 toward a non-recording position at the rear end of the movement range.

Figure 11:
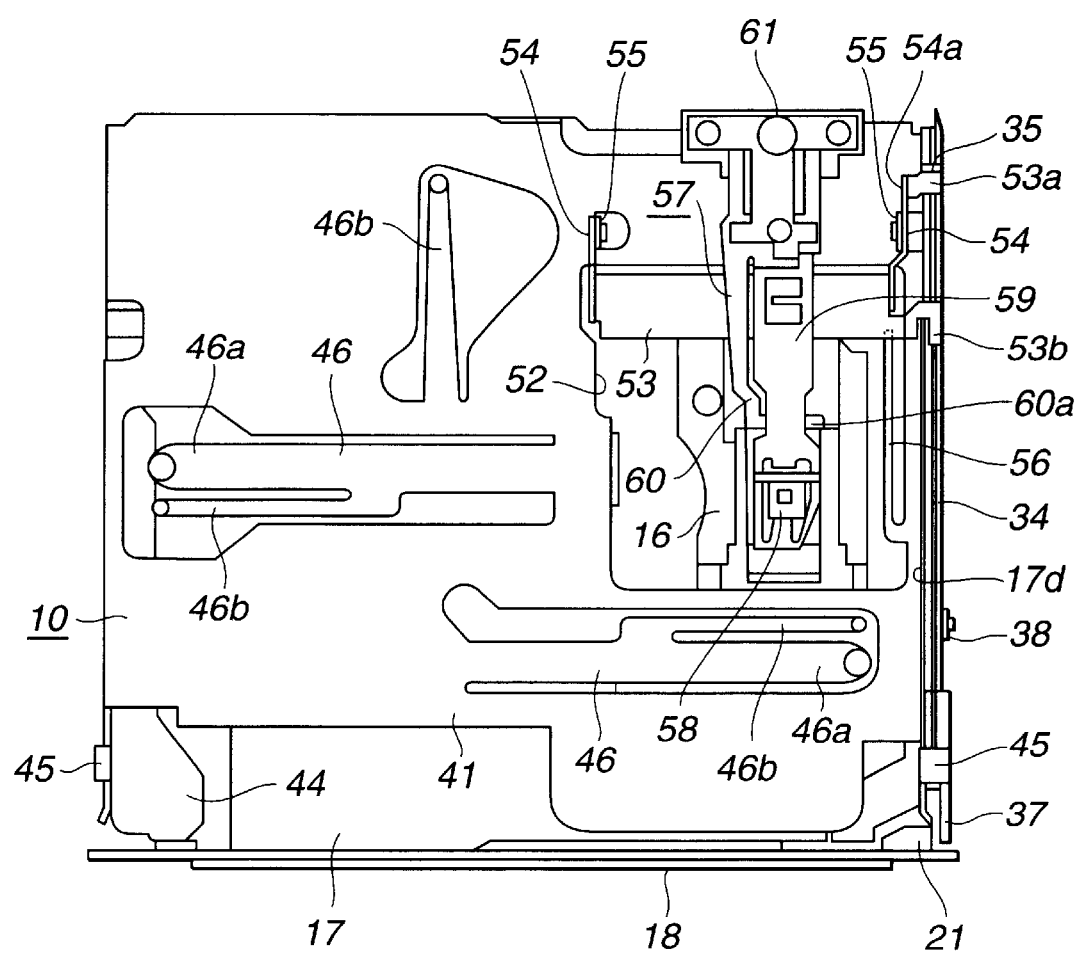
FIG. 11 is a plan view showing the internal mechanism of the magneto-optical disc recording/reproducing device.

The holder 10, in which the disc cartridge 2 is inserted and held, is made of an elastic plate material such as a metal plate and is constituted by a top plate 41, side plates 42, 43 bent downward from both lateral edges of the top plate 41, and receiving plates 44, 44 protruding toward each other from the lower edges of the side plates 42, 43, as shown in FIGS. 9 and 11. The holder 10 has its rear end portion rotatably supported on the upper side of the rear end portion of the base 17, and the disc cartridge 2 is inserted into a flat space surrounded by the top plate 41, the side plates 42, 43 and the receiving plates 44, 44.

On the upper edges of front end portions of the left and right side plates 42, 43 of the holder 10, hooked pieces 45, 45 protruding outward are provided, respectively. The hooked pieces 45,45 are caught on hook portions, not shown, formed on the cover body 8. Specifically, when the holder 10 is rotated to the loading position for loading the disc cartridge 2 to the driving section 9, that is, the lower movement end, and the cover body 8 is rotated slightly toward the opening position from the closing position, the hook portions catch the hooked pieces 45, 45 of the holder 10. As the cover body 8 is further rotated toward the opening position, the holder 10 is rotated toward the unloading position for unloading the disc cartridge 2, that is, the upper movement end.

On the top plate 41 of the holder 10, two spring portions 46, 46 are formed as rise tabs with their distal ends located slightly upward. These spring portions 46, 46 are formed in a branched shape and have wide cover body push-up portions 46a, 46a and narrow cartridge retaining portions 46b, 46b. The cover body push-up portions 46a, 46a are located at higher positions than the cartridge retaining portions 46b, 46b. Meanwhile, a single cartridge retaining portion 46b is formed at another location on the top plate 41.

In the state where the cover body 8 is located at the position for closing the body case 7 shown in FIG. 6, the cover body push-up portions 46a, 46a of the spring portions 46, 46 are pressured downward by the cover body 8, and the spring portions 46, 46 flex downward so that the cartridge retaining portions 46b, 46b press the disc cartridge 2 against the receiving plates 44, 44. When the cover body 8 is rotated to the opening position, the hook portion, not shown, of the cover body 8 catches and pulls up the hooked pieces 45, 45 of the holder 10, and therefore the holder 10 rotates to the unloading position.

Accordingly, as the cover body 8 is rotated from the closing position toward the opening position, the elastic force stored by the spring portions 46, 46 acts on the cover body 8 via the cover body push-up portions 46a, 46. The cover body 8 is rotated substantially above the holder 10 and is substantially opened to the holder 10, as shown in FIG. 7.

Figure 13:
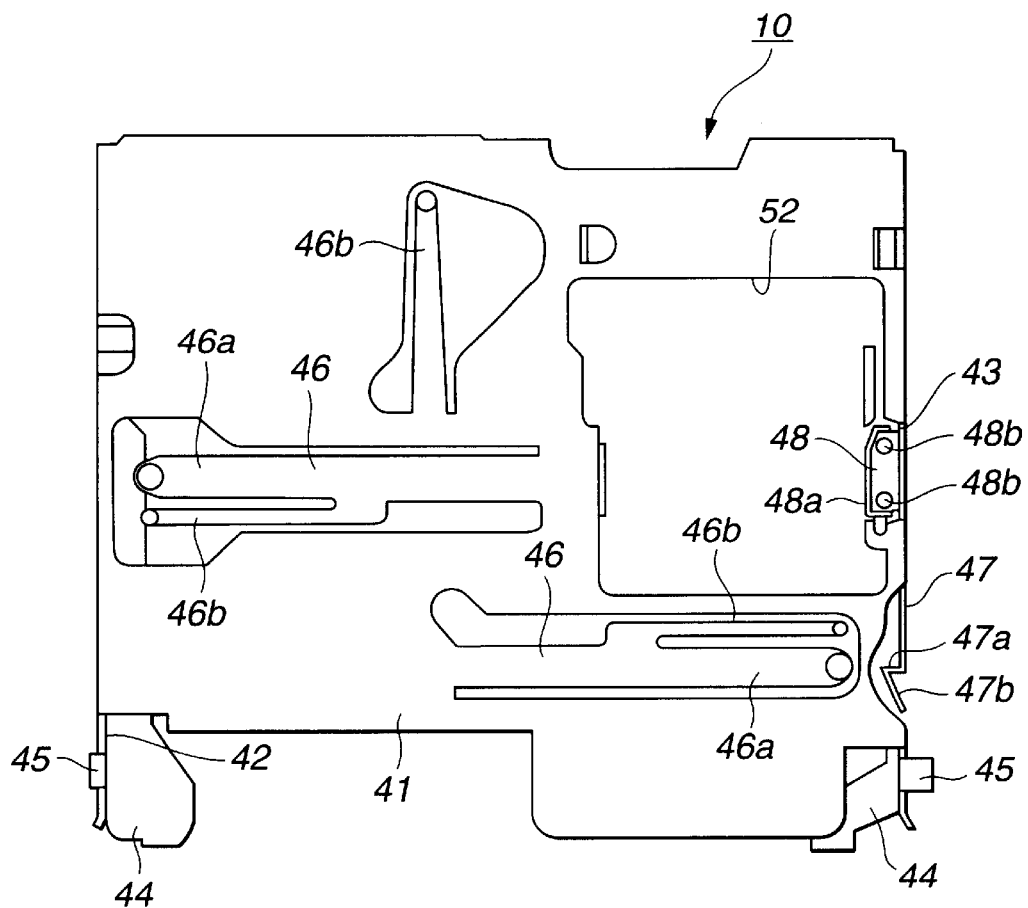
FIG. 13 is a plan view showing the holder for holding the disc cartridge.

On a front half portion of the sidewall 43 located on the right side of the holder 10 in FIGS. 9 and 13, a shutter return spring 47 protruding inside the holder 10 is formed in a punched-out state. The shutter return spring 47 is formed to be long in the back-and-forth direction, with its rear end made continuous to the sidewall 43 and with its front end portion protruding inside the holder 10. The front end portion of the shutter return spring 47 is bent in a wedge shape, where a hook portion 47a making substantially right angles with the right sidewall 43 and a lead-in portion 47b extending forward from the inner end of the hook portion 47a and inclined rightward are formed.

Figure 14:
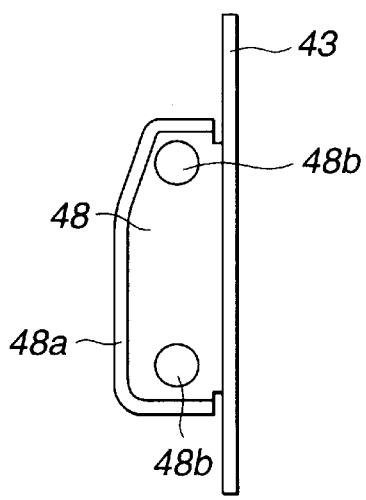
FIG. 14 is an enlarged plan view showing a shutter opening member.
Figure 15:
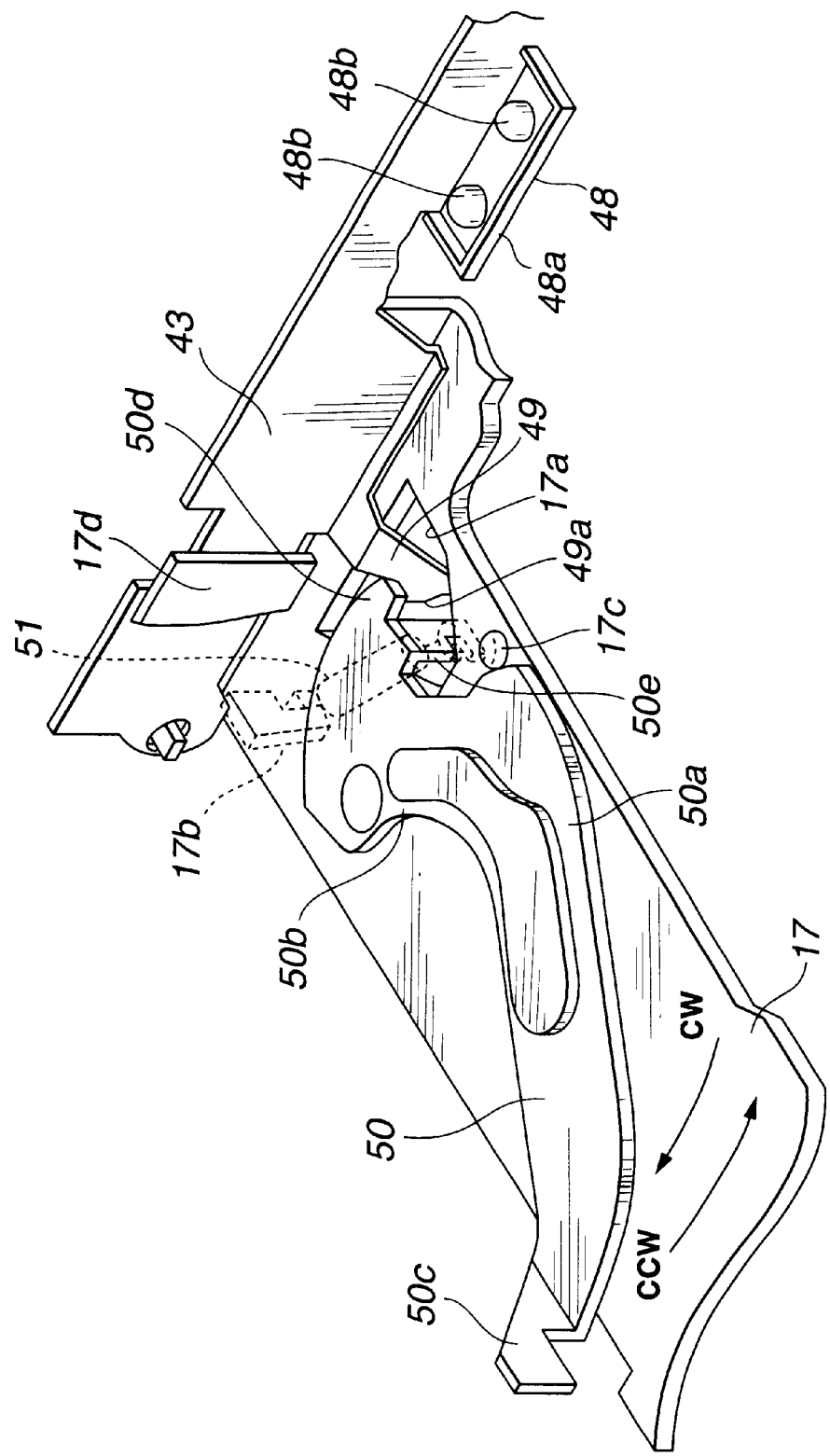
FIG. 15 is an enlarged plan view showing an ejection lever and related members, with a portion thereof being cut out.

At a portion of the holder 10 slightly backward from the center in the back-and-forth direction of the right sidewall 43, a shutter opening member 48 is formed by bending a part of the right sidewall 43 inward (see FIGS. 13 to 15). The shutter opening member 48 has a plate-like shape which is long in the back-and-forth direction, and has its circumferential portion bent upward to form a bent edge 48a. Moreover, punch-out protrusions 48b, 48b distanced away from each other in the back-and-forth direction and punched out upward are formed. The upper surfaces of the punch-out protrusions 48b, 48b are semispherical surfaces and the height of punching out upward of the punch-out protrusions 48b, 48b is greater than the height of bending upward of the bent edge 48a.

At a portion of the holder 10 close to the rear end of the right receiving plate 44, an unlock piece 49 protruding downward is provided, and a pawl 49a facing upward is formed on the rear edge of the unlock piece 49 (see FIG. 15).

An ejection lever 50 is rotatably supported at a right back portion on the upper surface of the base 17 (see FIGS. 8 and 15). The ejection lever 50 is made of a metal plate such that a main portion 50a extending substantially in the right-and-left direction and a bent portion 50b extending substantially rearward from the right end of the main portion 50a are continuously formed substantially in the shape of L fallen sideways. A pressure piece 50c protruding upward is formed at the left end portion of the main portion 50a, and an engaged piece 50d protruding in an obliquely right forward direction is formed at the rear end portion of the bent portion 50b. A spring hook piece 50e protruding downward is formed between the bent portion 50b and the engaged piece 50d.

With respect to the ejection lever 50, the rear end portion of the bent portion 50b is rotatably supported at the rear end of the right end portion of the base 17 in the state where the main portion 50a and the bent portion 50b are located in contact with the upper surface of the base 17, and spring hook piece 50e is protruding on the lower surface of the base 17 through an insertion hole 17a formed at the rear end of the right end portion of the base 17.

Between the spring hook piece 50e of the ejection lever 50 and a spring hook piece 17b formed to protrude downward at the rear right end portion of the base 17, a tension spring 51 is provided as shown in FIGS. 12 and 15, and the ejection lever 50 is biased counterclockwise as viewed from above, that is, in the direction of an arrow CCW in FIG. 15 and in the direction of pressing the main portion 50a to the base 17, by the tension spring 51.

Substantially on the left side of the insertion hole 17a of the base 17, a retaining protrusion 17c punched out upward is formed as shown in FIG. 15.

On the top plate 41 of the holder 10, a large aperture 52 is formed at a position corresponding to the aperture 29 of the base 17 (see FIGS. 9, 11 and 13).

At a position close to the rear edge of the aperture 52 of the top plate 41, a head shift plate 53 is supported rotatably in the up-and-down direction so as to protrude toward the aperture 52, as shown in FIGS. 9 and 11. The head shift plate 53 is formed in a size such that its lateral width substantially covers the lateral width of the aperture 52, and supported pieces 54, 54 provided to protrude rearward from both lateral portions of the rear end portion are rotatably supported by supporting pieces 55, 55 provided on the top plate 41 of the holder 10.

The supported piece 54 located on the right side in FIG. 9 is extended further rearward from the portion supported by the supporting piece 55. A driven piece 53a protruding rightward is formed at the rear end of the rear extending portion 54a, and a spring abutment piece 53b protruding rightward from the right lateral edge close to the front end of the head shift 53 is provided.

As a rear end portion of a plate-like return spring 56 which is long in the back-and-forth direction and integrally formed on the top plate 41 so as to follow the right lateral edge of the aperture 52 is caused to elastically contact the spring abutment piece 53b of the head shift plate 53 from the lower side, the front end portion of the head shift plate 53 is biased upward and the rear end portion thereof, that is, the portion where the driven piece 53a is formed, is biased downward. As a result, the driven piece 53a is located oil the inclined cain edge 35 of the control lever 34 (see FIGS. 11 and 22).

A magnetic head device 57 has a head supporting arm 59 supporting a magnetic head 58 on its distal end, and an arm supporting plate 60 for regulating excessive downward displacement of the distal end portion of the head supporting arm 59, as shown in FIGS. 8, 9 and 11. The head supporting arm 59 is formed by punching out an elastic thin metal plate like phosphor bronze. With respect to the arm supporting plate 60, a distal end portion 60*a* bent in an L-shape supports the lower surface of the distal end of the head supporting arm 59, and the proximal end portions of the arm supporting plate 60 and the head supporting arm 59 are fixed and supported on an upper end portion 61*a* of a connection member 61 which has a U-shaped lateral surface. A lower end portion 61*b* of the connection member 61 is fixed on the lower surface of the optical pickup 16, as shown in FIG. 12.

At a position on the bottom of the base 17 shown in FIG. 12 on the side facing the ejection lever 50, a battery housing section is constituted in which a battery 100 is housed.

In the magneto-optical disc recording/reproducing device 1 according to the present invention, as shown in FIG. 8, though the ejection lever 50 is arranged on the side where the optical pickup 16 and the magnetic head device 57 are arranged, only the pressure piece 50*c* is protruding upward from the base 17, and all of the main portion 50*a*, the bent portion 50*b* and the engaged piece 50*d* are located along the upper surface of the base 17 while the spring hook piece 50*e* is protruding on the lower side of the base 17. Therefore, the ejection lever 50 does not interfere with the other members arranged on the base 17, particularly, with the connection member 61 for connecting the optical pickup 16 with the magnetic head device 57, and miniaturization of the magneto-optical disc recording/reproducing device 1 can be realized by realizing effective use of the space.

A control device for controlling the operation of the magneto-optical disc recording/reproducing device according to the present invention will now be described with reference to FIG. 16.

The control device has a control section 62 made up of a microcomputer or the like, and this control section 62 controls driving of the optical pickup 16 through an optical pickup drive control section 63. Also, the driving motor 39 is controlled by the control section 62 through a motor driving section 64, and a head lift mechanism 65 made up of the control lever 34, the head shift plate 53 and the like is controlled to carry out lift operation of the magnetic bead 58. Moreover, detection outputs of a recording switch 66 and a half-lock switch 67 are inputted to the control section 62 and various controls are carried out on the basis of the inputs.

The operation of the magneto-optical disc recording/reproducing device 1 according to the present invention will now be described with reference to FIGS. 17 to 24.

First, in the state shown in FIG. 6, the cover body 8 is at the closing position. In this state, recording or reproduction of information signals to or from the magneto-optical disc 4 is carried out. Also, at the time of stop when the recording/reproducing operation is not carried out, the cover body 8 is in the closing state as shown in FIG. 6.

At the time of stop, as the opening operation knob 11 is moved from the state shown in FIG. 6 into the unlocking direction, that is, in the direction of the arrow H in FIG. 7, the lock lever 18 is pressured into the unlocking direction, that is, in the direction of the arrow H in FIG. 7, via the opening operation lever 23 and the tension spring 24, and the lock lever 18 moves in the unlocking direction while compressing the compressed coil spring 20 (see a double-chain-dotted line in FIG. 17). In this case, since the tensility of the tension spring 24 is set to be greater than the expansibility of the compressed coil spring 20, as described above, the tension spring 24 hardly expands. Then, as the lock lever 18 is moved in the unlocking direction, the engagement between the lock pawl 19 of the lock lever 18 and the retaining portion 25*a* of the engagement member 25 of the cover body 8 is canceled, as indicated by a double-chain-dotted line in FIG. 17.

When the engagement between the lock pawl 19 and the retaining portion 25*a* is canceled, the cover body 8 is rotated slightly toward the opening position by the elastic force of the spring portions 46, 46 of the holder 10 deformed by the pressure of the cover body 8 located at the closing position. Then, as the user holds and lifts up the front end portion of the cover body 8, the cover body 8 rotates to the opening position shown in FIG. 7 and the hooked portions 45, 45 are pulled up by the hook portions, not shown, of the cover body 8, thus rotating the holder 10 to the unloading position shown in FIG. 7.

If the user eliminates the force applied to the opening operation knob 11, the opening operation knob 11, the opening operation lever 23 and the lock lever 18 are returned into the direction of the arrow I in FIG. 17 by expansion of the compressed coil spring 20.

Next, the user inserts the disc cartridge 2 into the holder 10 rotated to the ejection position.

In the process of inserting the disc cartridge 2 into the holder 10, the shutter member 6 moves to the opening position and the optical pickup access hole and the head access hole 5 are opened. That is, as the disc cartridge 2 is inserted into the holder 10, the shutter opening member 48 formed on the right side plate 43 of the holder 10 relatively enters the groove 3*a* of the disc cartridge 2 (see a double-chain-dotted line in FIG. 18), thus pressuring the pressured portion 6*b* of the lock member locking the shutter member 6 at the closing position so as to unlock the shutter member 6 and also pressuring the shutter member 6 toward the opening position. When the shutter member 6 moved toward the opening position reaches the opening position, the hook portion 47*a* of the shutter return spring 47 provided on the right side plate 43 of the holder 10 is engaged with the engagement hole 6*a* of the shutter member 6.

The shutter opening member 48 is formed by cutting and raising a part of the holder 10 formed by bending a metal plate, and its circumferential edge portion is bent in one direction as shown in FIG. 14, for example, upward in FIG. 14, to form the bent edge 48*a*. Therefore, it is possible to prevent the edge of the shutter opening member 48 from shaving off at least one of lateral sides facing the groove 3*a* when the shutter opening member 48 moves within the groove 3*a* of the disc cartridge 2. The shutter member 48 also have the punch-out protrusions 48*b*, 48*b* punched out in the same direction as the bending direction of the bent edge 48*a*, and the punch-out protrusions 48*b*, 48*b* have semi-spherical upper surfaces and a punch-out height greater than the bending height of the bent edge 48*a*. Therefore, of the lateral surfaces of the groove 3*a*, the surface located in the bending direction of the bent edge 48*a*, will not be shaven off. Moreover, since the shutter opening member 48 is made of a thin metal plate and has the bent edge 48*a* formed thereon, the shutter opening member 48 has a substantial thickness. For example, in the case where there is a gap between the lateral surface of the groove 3*a* of the disc cartridge 2 and the pressured portion 6*b* of the lock member, it is possible to avoid such a situation that the shutter opening member 48 enters the gap to disturb the opening of the shutter member 6.

In the above description, the shutter opening member 48 having the punch-out protrusions 48b, 48b formed on its one side alone is described. However, the present invention is not limited to this structure and the punch-out protrusions may provided on both sides of the shutter opening member.

The height of the shutter opening member 48, that is, the distance from the right receiving plate 44 of the holder 10, is set so as to prevent the shutter opening member 48 from contacting the lateral surface of the groove 3a of the disc cartridge 2 in the state where the lower surfaces of both lateral portions of the disc cartridge 2 are set on the receiving plates 44, 44. This is for the purpose of preventing application of the load of the disc cartridge 2 onto the shutter opening member 48 and thus preventing deformation of the shutter opening member 48.

Figure 19A:
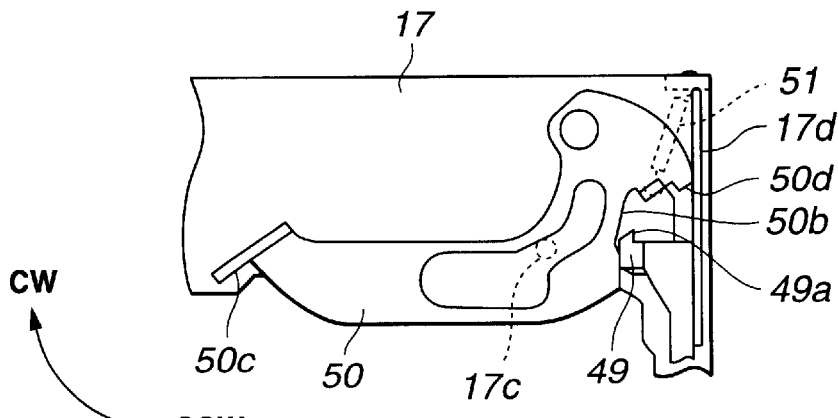
FIG. 19A is a plan view showing essential portions including the ejection lever in the case where the ejection lever is at an ejection position.

Meanwhile, at the same time as the disc cartridge 2 is inserted into the holder 10, the pressure piece 50c of the ejection lever 50 located at the ejection position shown in FIG. 19A is pressured by the disc cartridge 2 through the biasing force of the tension spring 51 and is rotated in the direction of an arrow CW in FIG. 19A, that is, clockwise as viewed from the top in FIG. 19A. Thus, the right lateral edge of the bent portion 50b is engaged with the retaining protrusion 17b punched out on the base 17 and is locked at the locking position (see FIG. 20A). In this state, the unlock piece 49 distanced away from the engaged piece 50d provided on the holder 10 as shown in FIGS. 19A and 19B is pressured substantially leftward, that is, in the direction of an arrow N in FIG. 19C, by the engaged piece 50d, and the unlock piece 49 is substantially flexed in the direction of the arrow N (see FIG. 20C).

Figure 19B:
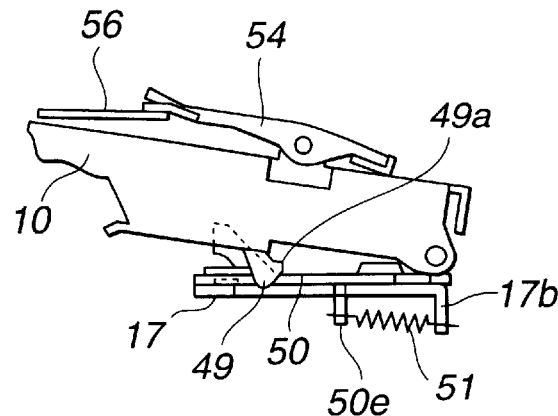
FIG. 19B is a side view thereof.
Figure 19C:
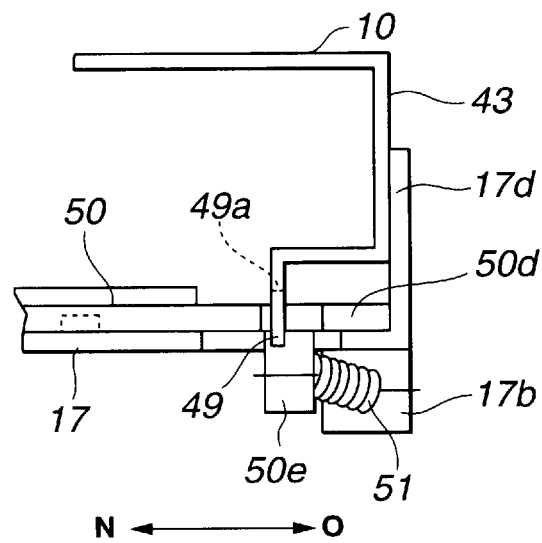
FIG. 19C is a front view in the case where the ejection lever is at that position.
Figure 20A:
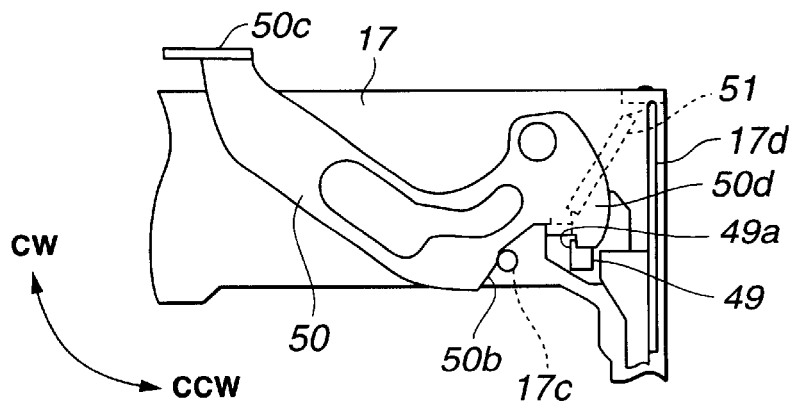
FIG. 20A is a plan view showing essential portions including the ejection lever in the state immediately before the holder reaches a loading position.
Figure 20B:
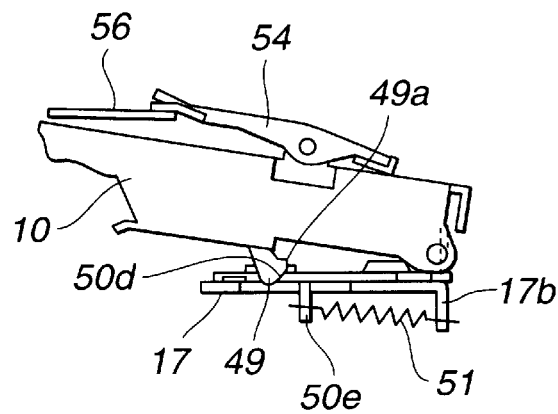
FIG. 20B is a side view thereof.
Figure 20C:
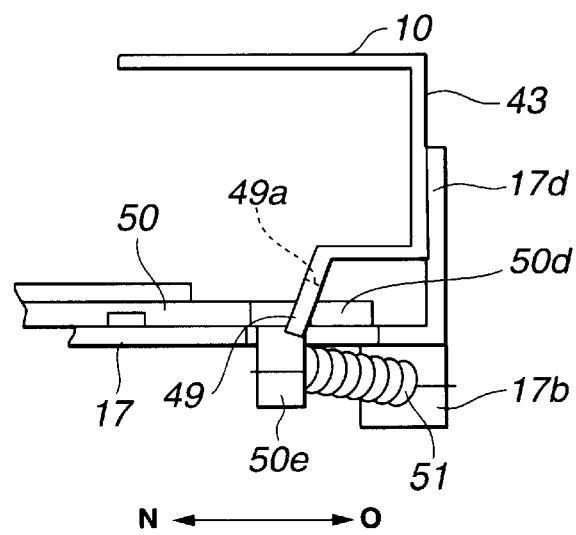
FIG. 20C is a front view thereof.
Figure 21A:
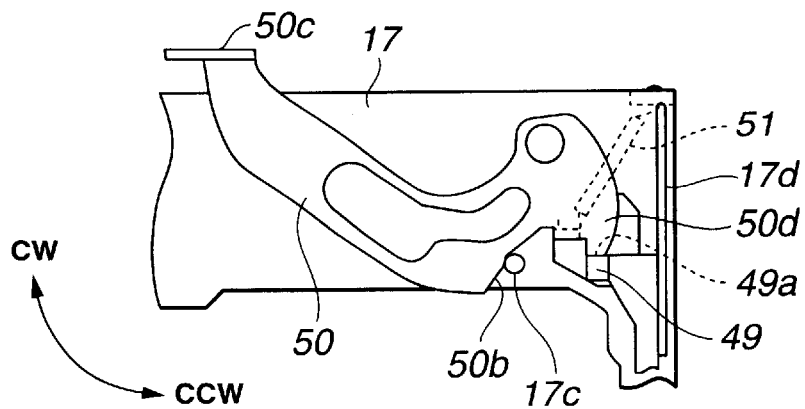
FIG. 21A is a plan view showing essential portions including the ejection lever in the case where the ejection lever is at a locking position.
Figure 21B:
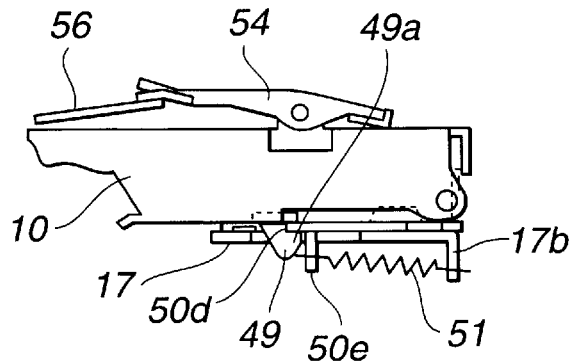
FIG. 21B is a side view thereof.
Figure 21C:
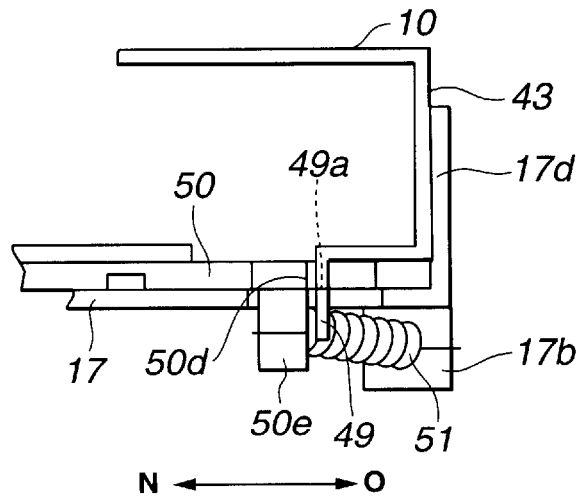
FIG. 21C is a front view thereof.

Subsequently, as the cover body 8 rotated toward the closing position, the holder 10 located at the unloading position as shown in FIG. 19B is rotated to the loading position (see FIG. 21B). The pawl portion 19a of the lock pawl 19 is engaged with the retaining portion 25a of the cover body 8, thus locking the cover body 8 at the closing position (as indicated by a solid line in FIGS. 6 and 17).

As described above, when the cover body 8 is rotated downward from the opening position shown in FIG. 7, the inclined portion 25b of the engagement member 25 is abutted against the inclined edge 19b of the lock pawl 19 and pressures the inclined edge 19b rightward, that is, in the direction of the arrow H in FIG. 17. Thus, the lock lever 18 moves in the direction of the arrow H while compressing the compressed coil spring 20, and the retaining portion 25a of the engagement member 25 can pass below the pawl portion 19a of the lock pawl 19. As the retaining portion 25a is located below the pawl portion 19a, the lock lever 18 is moved in the direction of the arrow I in FIG. 17 by the expansibility of the compressed coil spring 20, and the pawl portion 19a of the lock pawl 19 is engaged from above with the retaining portion 25a of the cover body 8. Therefore, the cover body 8 is locked at the closing position shown in FIG. 6 (as indicated by a solid line in FIG. 17).

In this case, the disc cartridge 2 is loaded at a predetermined loading position on the driving section 9 and the magneto-optical disc 4 is clamped on the turntable 28.

While the holder 10 is moving the unloading position to the loading position, the pawl 49a of the unlock piece 49 of the holder 10 slides on the left lateral edge of the engaged piece 50d of the ejection lever 50 and relatively moves downward below the ejection lever 50. Then, as the holder 10 reaches the loading position, the engaged piece 50d of the ejection lever 50 is eliminated from the right lateral side of the pawl 49a and therefore the flexed unlock piece 49 is restored to the original state. Thus, the pawl 49a of the unlock piece 49 moves into the direction of an arrow O and enters under the engaged piece 50d of the ejection lever 50 (see FIGS. 21B and 21C).

Figure 22:
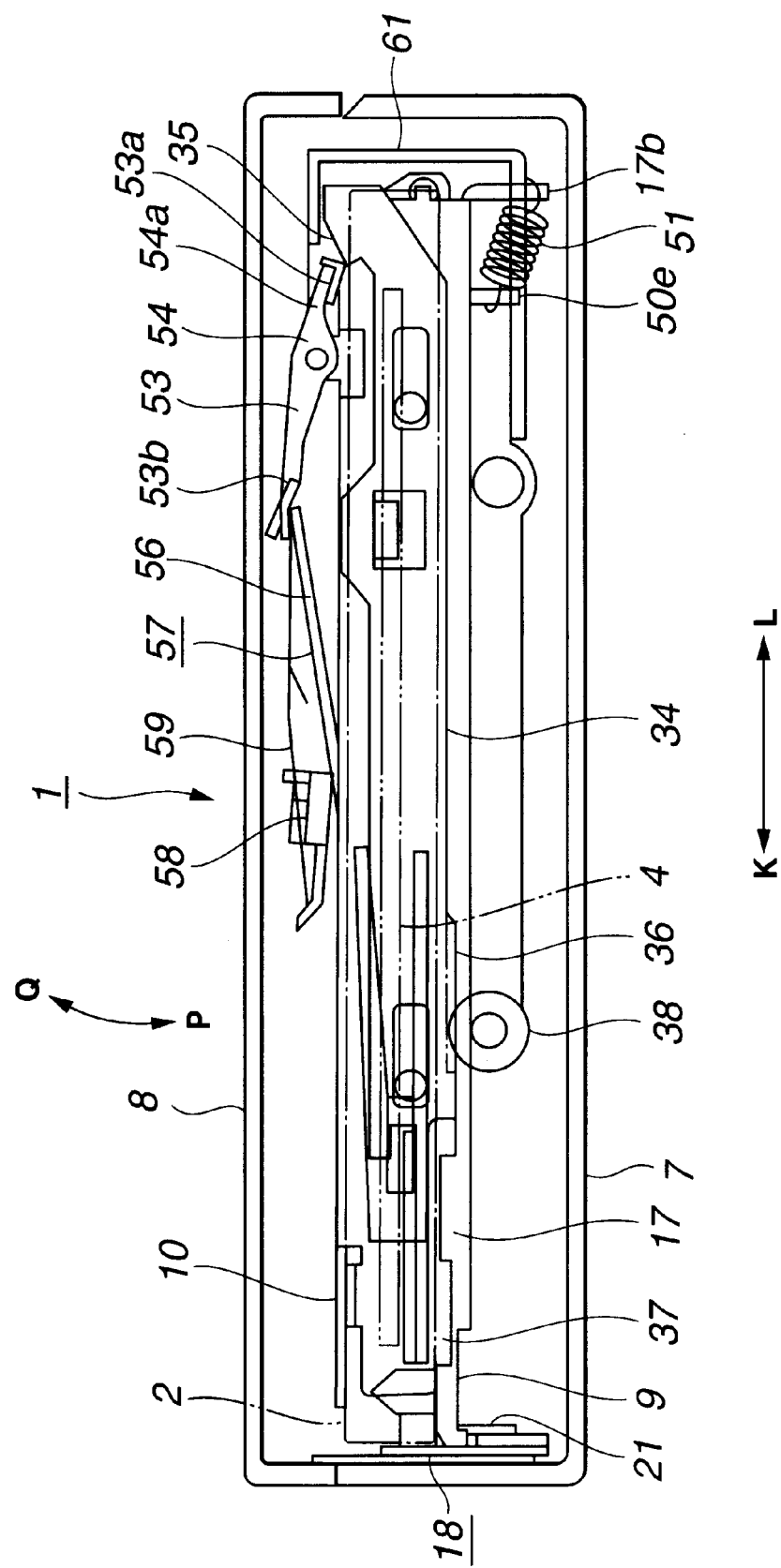
FIG. 22 is a side view in the case where the disc recording/reproducing device is in the non-recording state.

In this state, the control lever 34 is at the rear end of the movement range, that is, at the non-recording position shown in FIG. 22, and the regulating portion 37 is located on the rear side on the right side of the regulated portion 21 of the lock lever 18. The lock lever 18 is movable in the direction of the arrow H in FIG. 6, which is the unlocking direction. That is, cancellation of the locking of the lock lever 18 at the closing position is possible. Moreover, the driven piece 53a of the head shift plate 53 is located on the front end portion of the inclined cam edge 35, and the front head of the head shift plate 53 is rotated to move upward by the biasing force of the return spring 56. The front end portion of the head shift plate 53 pushes up the arm supporting plate 60 and the head supporting arm 59, and therefore the magnetic head 58 is at the non-recording position up away from the magneto-optical disc 4 (see FIG. 22).

In the magneto-optical disc recording/reproducing device 1 according to the present invention, since the head shift plate 53 as the head moving member is biased toward the non-recording position by the return spring 56 as the biasing means, the head shift plate 53 is moved toward the non-recording position by the return spring 56 unless other forces are applied to the head shift plate 53. Thus, there is no risk that the magnetic head 58 is damaged by the magneto-optical disc 4 or the like pushed into the holder 10.

In the case of carrying out reproduction from the magneto-optical disc 4, the operation to reproduce signals is carried out in the state where the magnetic head 58 is away from the magneto-optical disc 4, as described above. Specifically, the magneto-optical disc 4 is rotated by the spindle motor 26 and the optical pickup 16 moves in the radial direction of the magneto-optical disc 4 while carrying out casting of a laser beam onto the signal recording surface of the magneto-optical disc 4 and detection of a return light thereof. Thus, reproduction of signals recorded on the magneto-optical disc 4 is carried out.

In the case of carrying out recording of signals onto the magneto-optical disc 4, the recording operation knob 12 provided on the front side of the body case 7 is moved into the recording direction, that is, into the direction of the arrow H in FIG. 6. As the recording operation knob 12 is moved into the direction of the arrow H in FIG. 6, the guide shaft 30 and the pinion 38 fixed at one end portion of the guide shaft 30 are rotated by driving of the control motor 39, and the rack 36 is fed by the pinion 38 to move the control lever 34 forward, that is, into the direction of the arrow K in FIG. 22. The regulating portion 37 provided at the front end is located immediately right to the regulated portion 21 of the lock lever 18 (see FIG. 23). Therefore, the locking of the cover body 8 at the closing position cannot be canceled.

In this state, if the opening operation knob 11 is moved into the unlocking direction, that is, into the direction of the arrow H in FIG. 6, the lock lever 18 is pulled into the unlocking direction, that is, into the direction of the arrow H in FIG. 17, through the opening operation lever 23 and the tension spring 24. However, since the regulating portion 37 of the control lever 34 is located immediately right to the regulated portion 21 of the lock lever 18, the regulated portion 21 is in contact with the regulating portion 37 (as indicated by a broken line in FIG. 17) and the lock lever 18 cannot move into the unlocking direction. The engagement between the pawl portion 19a and the retaining portion 25a is not canceled and the cover body 8 remains locked at the closing position.

In this case, though the lock lever 18 does not move into the unlocking direction, the opening operation lever 23 and the opening operation knob 11 move into the unlocking direction as the tension spring 24 expands. Therefore, the operator experiences a touch close to that of the normal opening operation and does not feel uncomfortable. Moreover, there is no risk that the opening operation knob 11, the opening operation lever 23, the lock lever 18 and the like are damaged by a certain forcible operation due to misunderstanding by the operator.

Figure 23:
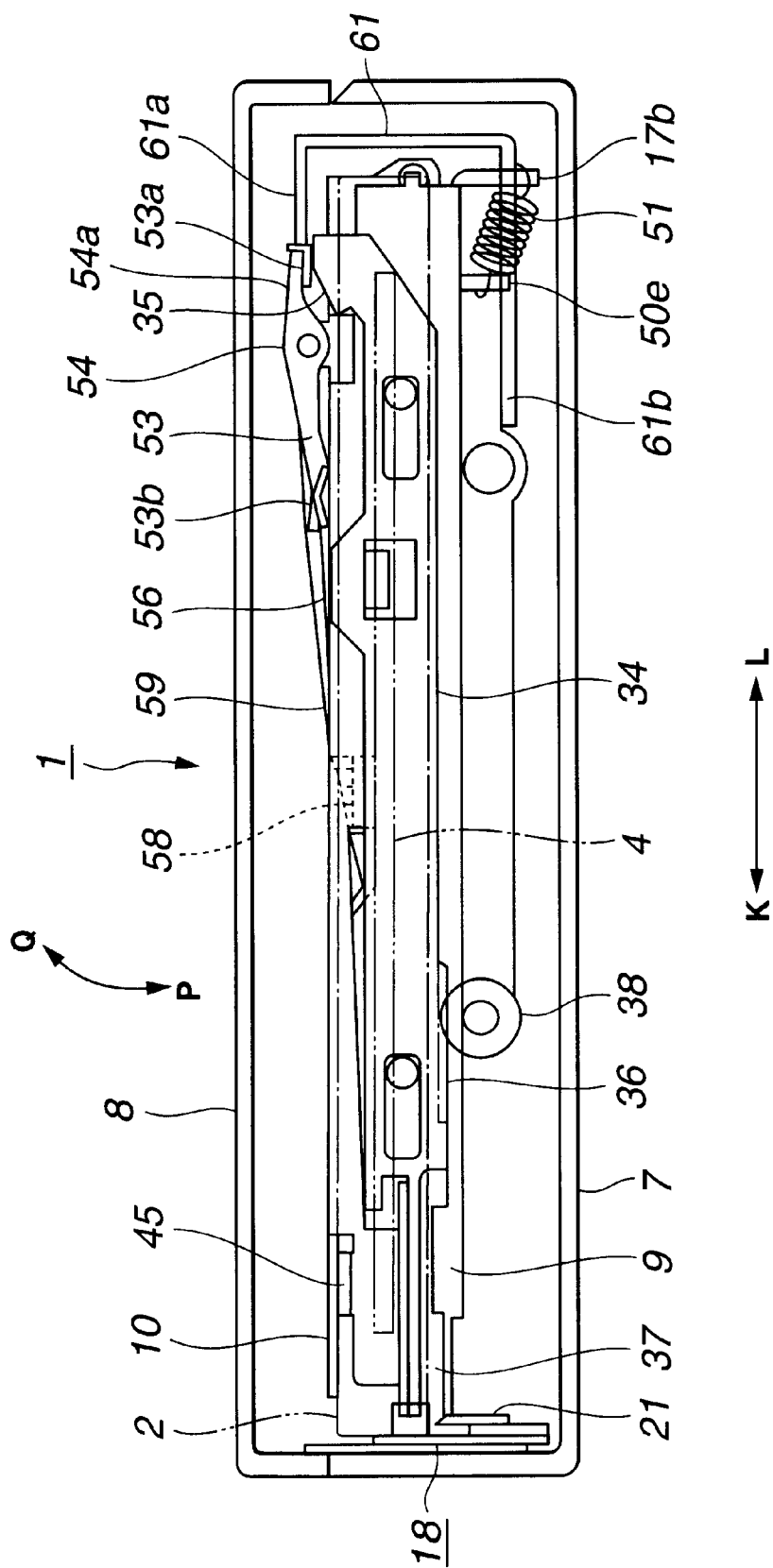
FIG. 23 is a side view in the case where the disc recording/reproducing device is in the recording state.
Figure 24:
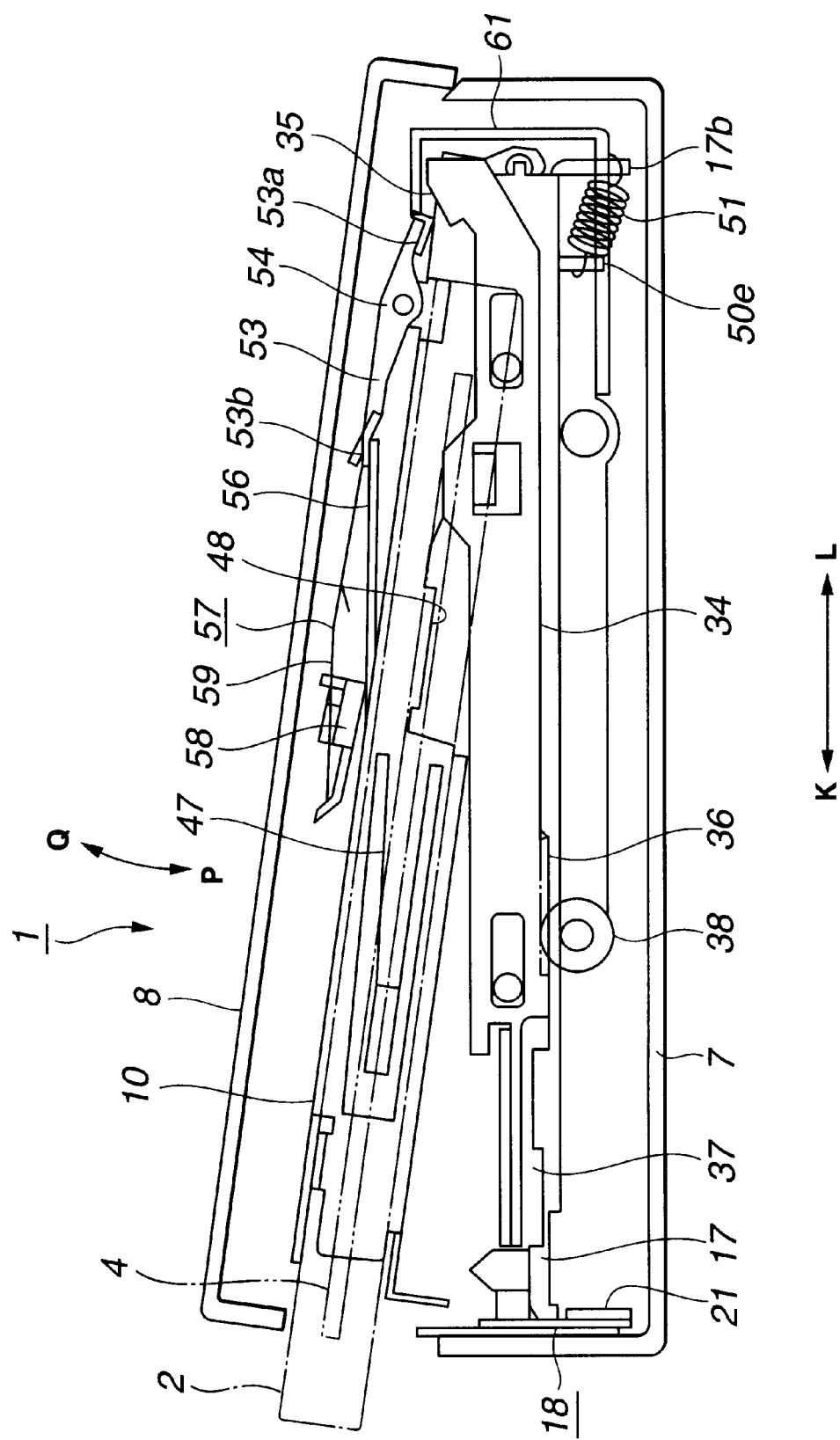
FIG. 24 is a side view showing the disc recording/reproducing device in the state where the disc cartridge is ejected.

The driven piece 53b of the head shift plate 53 slides up on the inclined cam edge 35 and is set on the highest position portion (see FIG. 23). The head shift plate 53 is rotated so that its front end moves downward against the biasing force of the return spring 56. As a result, the arm supporting plate 60 and the head supporting arm 59 rotate downward, that is, in the direction of an arrow P in FIG. 22, and the magnetic head 58 is abutted at the position, on the upper surface of the magneto-optical disc 4, corresponding to the portion irradiated with a laser beam by the optical pickup 16 (see FIG. 23). In this state, a stronger laser beam than in reproduction is cast by the optical pickup 16 onto the signal recording surface of the magneto-optical disc 4 and a magnetic field is applied by the magnetic head 58. Thus, signals are newly recorded on the signal recording surface of the magneto-optical disc 4. Such recording of signals is carried out while moving the optical pickup 16 in the radial direction of the magneto-optical disc 4, and the magnetic head 58 is also moved together with the optical pickup 16.

Figure 25:
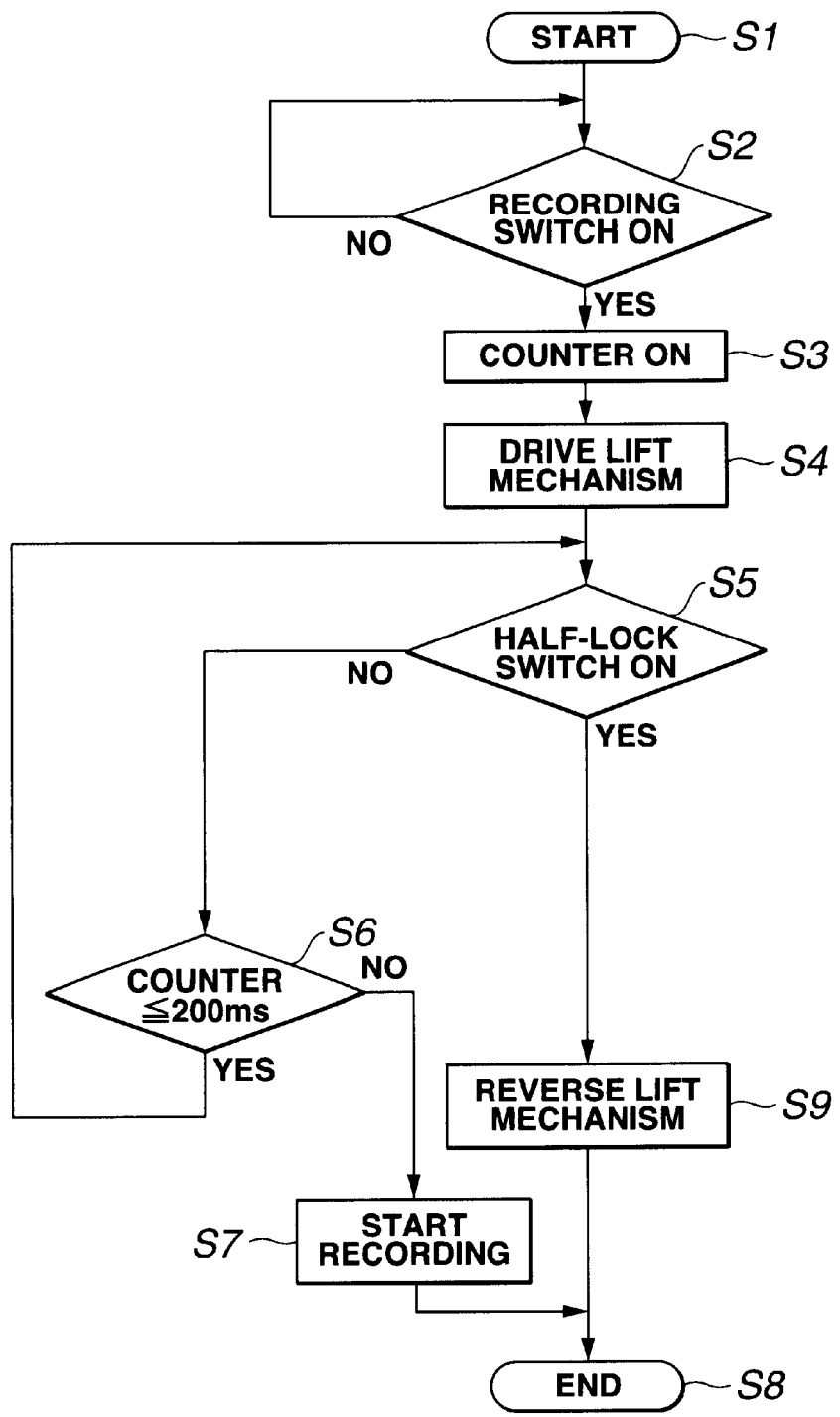
FIG. 25 is a flowchart showing the procedure to prohibit opening of the cover body.

It takes a certain time period, for example, 200 milliseconds (ms) for the control lever 34 to reach the recording position at the front end of the movement range after the recording operation knob 12 is operated. Thus, for example, if the opening operation knob 11 is operated into the unlocking direction while the control lever 34 reaches the recording position after the recording operation knob 12 is operated, the locking of the cover body 8 at the closing position is canceled and therefore there is a risk that the holder 10 may be rotated to the unloading position, unloading the disc cartridge 2. If the disc cartridge 2 is unloaded from the holder 10 in this state, the magneto-optical disc 4, the cartridge case 3, the shutter member 6 or the like may contact the magnetic head 58 in the course of moving to the recording position, and the magneto-optical disc 4 and the magnetic head 58 may be damaged. Thus, in preparation for such a case, the control section 62 carries out operation as shown in the flowchart of FIG. 25 so as to avoid the risk of damage to the magnetic head 58 and the like.

Figure 16:
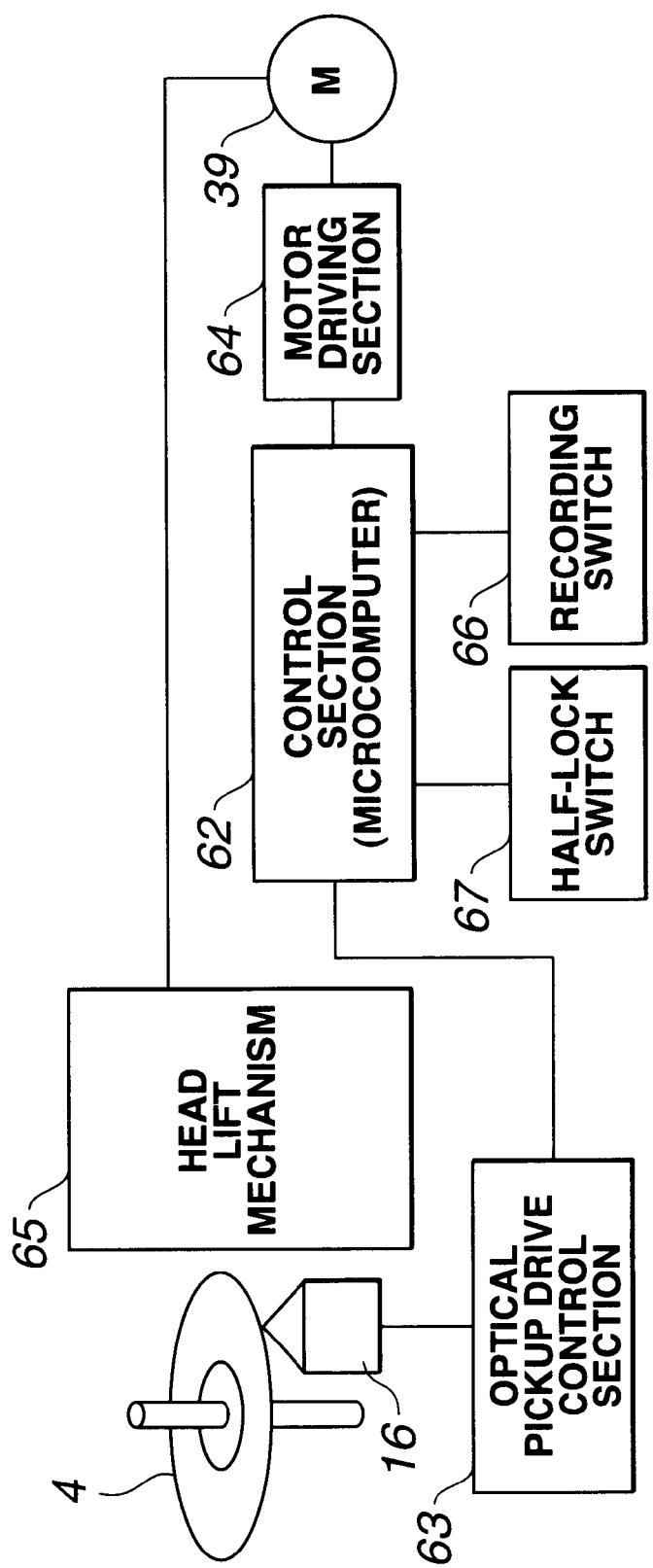
FIG. 16 is a block diagram showing essential portions of a control device.

In FIG. 16, the recording switch 66 is a switch that is turned on as recording operation knob 12 moves in the recording direction, that is, in the direction of the arrow H in FIG. 6, and the half-lock switch 67 is a switch that is operated and turned on by the switch pressing piece 22 of the lock lever 18 as the lock lever 18 moves in the unlocking direction, that is, in the direction of the arrow H in FIG. 6.

The control section 62 moves the magnetic head 58 to the recording position so as to enter the recording operation, only when the recording switch 66 is on and the half-lock switch 67 is not turned on within a predetermined tine period. Even when the recording switch 66 is on, if the half-lock switch 67 is turned on within the predetermined time period, the control section 62 reverses the control motor 39 to return the magnetic head 58 to the non-recording position.

The processing to prohibit opening of the cover body 8 will now be described with reference to the flowchart of FIG. 25.

At step S1, the magneto-optical disc recording/reproducing device 1 starts.

At step S2, whether the recording switch 66 is on or not is detected. If the recording switch 66 is on, the processing goes to step S3. If the recording switch 66 is off, the detection processing of the recording switch 66 is repeated.

At step S3, the counter inside the control section 62 is turned on to start timekeeping.

At step S4, driving of the lift mechanism, that is, driving of the control motor 39, is started.

At step S5, whether the half-lock switch 67 is on or not is confirmed by the control section 62. If the half-lock switch 67 is off, the processing goes to step S6 to check the counter. If the half-lock switch 67 is on, the processing goes to step S9 to reverse the lift mechanism.

At step S6, the counter is checked. If the value of the counter has not passed 200 ms, confirmation as to whether the half-lock switch 67 is on or not is carried out at step S5. If the value of the counter has passed 200 ms, the processing goes to step S7 to start the recording operation.

At step S7, the recording operation is started. At the end of the recording operation, the processing ends (step S8).

At step S9, the lift mechanism is reversed, that is, the control motor 39 is reversed to return the magnetic head 58 to the non-recording position and then the processing ends (step S8).

As recording of signals onto the magneto-optical disc 4 ends, the control lever 34 is moved rearward, that is, in the direction of the arrow L in FIG. 23, through driving of the control motor 39, and the regulating portion 37 moves rearward from the position on the right side of the regulated portion 21 of the lock lever 18, thus making it possible to unlock the cover body 8 from the closing position (see FIG. 22). At the same time, the front end of the inclined cam edge 35 moves to the position corresponding to the driven piece 53a of the head shift plate 53, and the head shift plate 53 rotates in the direction of the arrow Q in FIG. 23 so that its front end portion is moved upward by the biasing force of the return spring 56. Thus, as the front end portion of the head shift plate 53 pushes up the arm supporting plate 60 and the head supporting arm 59 upward, the magnetic head 58 supported at the front end portion of the head supporting arm 59 moves upward and away from the magneto-optical disc 4 (see FIG. 22).

Then, the opening operation knob 11 is moved rightward, that is, into the direction of the arrow H in FIG. 6, and the lock lever 18 is moved into the direction of the arrow H in FIG. 17 to detach the lock pawl 19 from the retaining portion 25a of the cover body 8, thus unlocking the cover body 18 from the closing position and moving the cover body 8 toward the opening position as shown in FIG. 7. Thus, the holder 10 together with the cover body 8 is rotated upward toward the unloading position (see FIG. 24).

As the holder 10 rotates toward the unloading position, the pawl 49a of the unlock piece 49 moving upward pulls up the engaged piece 50d of the ejection lever 50 upward. Therefore, the bent portion 50b of the ejection lever 50 slightly floats from the upper surface of the base 17, and at this moment, the engagement between the bent portion 50b of the ejection lever 50 and the retaining protrusion 17c of the base 17 is canceled. The ejection lever 50 is rotated counterclockwise as viewed from above, that is, into the direction of the arrow CCW in FIG. 21A, by the biasing force of the tension spring 51. By this rotation, the pressure piece 50c moving substantially forward pushes the disc cartridge 2 and a part of the disc cartridge 2 protrudes from the holder 10 (see FIG. 24). Therefore, the user can hold the part protruding from the holder 10 and take out the disc cartridge 2 from the holder 10.

A part of the ejection lever 50 rides on the retraining protrusion 17c and stops where the engaged piece 50d is engaged with the right sidewall 17d of the base, that is, at the ejection position (see FIG. 19A).

The shutter member 6, located at the opening position when the user takes out the disc cartridge 2 from the holder 10, is pulled relatively toward the closing position by the hook portion 47a of the shutter return spring 47 engaged with the engagement hole 6a and is moved to the closing position.

As the holder 10 reaches the unloading position shown in FIG. 7, the disc cartridge 2 is pressured by the ejection lever 50 and a part of the disc cartridge 2 protrudes from the holder 10, as described above. Then, the disc cartridge 2 on which reproduction and/or recording of signals has been completed is taken out from the holder 10, and the user newly inserts a disc cartridge 2 for carrying out reproduction or recording of information signals, into the holder 10.

The above-described shapes and structures of the individual are only specific examples used in the embodiment of the present invention, and various modifications can be effected without departing from the scope of the present invention.

Industrial Applicability

With the magneto-optical disc recording/reproducing device according to the present invention, the major part of the ejection lever for ejecting the magneto-optical disc held by the holder for carrying out loading/unloading the magneto-optical disc at the disc loading position is arranged along the base surface, and the portion protruding from the base toward the holder is only the pressure portion for pressuring the disc. Therefore, even though the ejection lever is arranged on the side where the optical pickup and the magnetic head are arranged, the ejection lever does not interfere with the other members and miniaturization of the device itself can be realized by effectively utilizing the space within the device body.

The magneto-optical disc recording/reproducing device capable of recording and reproduction and the reproduction-only optical disc reproducing device have the substantially common structure except for the presence of the magnetic head and the connection member. Therefore, the ejection lever used in the present invention can be used in both devices and common use of component parts in the magneto-optical disc recording/reproducing device and the optical disc reproducing device can be realized.

Moreover, the head moving member for moving the magnetic head toward and away from the magneto-optical disc is biased so that the magnetic head is located outside of the holder. Therefore, collision between the magneto-optical disc loaded in and unloaded from the holder and the magnetic head can be avoided and protection of the magnetic head and the magneto-optical disc can be realized.

Furthermore, the shutter opening member constituting the shutter opening mechanism can prevent damage to the disc cartridge by insertion to and ejection from the groove portion provided on the disc cartridge.

In addition, the lock mechanism for locking the cover body for opening/closing the body case at the closing position enables movement of the operating portion in the unlocking direction even when the movement of the lock lever in the unlocking direction is regulated. Thus, unlocking of the cover body due to a forcible operation can be prevented and accurate recording or reproduction of information signals can be carried out.

What is claimed is:

1. A magneto-optical disk recording/reproducing device comprising:

a holder rotatably mounted on a base for holding a magneto-optical disc inserted therein and for moving said magneto-optical disc between a disc unloading position and a disc loading position;

a turntable arranged on the base for rotationally driving the magneto-optical disc held in the holder that has been moved to the disc loading position;

an optical pickup slidably mounted on the base for casting a light beam onto a signal recording surface of the rotationally driven magneto-optical disc;

a magnetic head arranged facing the optical pickup on an opposite side of the magneto-optical disc and being movable between a recording position adjacent the magneto-optical disc and a nonrecording position away from the magneto-optical disc;

a connection member for connecting the optical pickup and the magnetic head;

an ejection lever rotatably mounted on the base and biased toward pressuring and ejecting, by a pressuring portion, the magneto-optical disc held by the holder, wherein the ejection lever is arranged on a periphery of the optical pickup and a main portion of the ejection lever is positioned along the base and a locus of rotation of the ejection lever and a locus of movement of the connection member are different from each other;

a lock lever for moving between a locked position for locking closed a cover body for opening/closing the optical pickup and the magnetic head and an unlocked position for canceling the locking;

regulating means for moving between a regulating position for regulating movement of the lock lever to the unlocked position and a nonregulating position for permitting movement of the lock lever to the unlocked position;

first biasing means for biasing the lock lever toward the locking position; and second biasing means for connecting the lock lever and an operating section with each other and biasing the lock lever toward the locked position, the second biasing means having a greater biasing force than the first biasing means.

2. The magneto-optical disc recording/reproducing device as claimed in claim 1, wherein when the regulating means is at the nonregulating position and the operating section is moved toward the unlocked position, the lock lever together with the operating section are moved to the unlocked position against the first biasing means, and when the regulating means is at the regulating position and the operating section is moved toward the unlocked position, only the operating section is moved to the unlocked position against the second biasing means.

3. The magneto-optical disc recording/reproducing device as claimed in claim 2, wherein the operating section provides a recording instruction to control the recording of signals onto the magneto-optical disc, and the regulating means moves from the nonregulating position to the regulating position in accordance with the recording instruction.

4. A cover body lock mechanism comprising:

a lock lever for moving between a locked position for locking closed a cover body for opening/closing a body portion and an unlocked position for canceling the locking of the cover body;

regulating means for moving between a regulating position for regulating movement of the lock lever to the unlocked position and a nonregulating position for permitting movement of the lock lever to the unlocked position;

first biasing means for biasing the lock lever toward the locked position; and second biasing means for connecting the lock lever and an operating section with each other and biasing the lock lever toward the locked position, the second biasing means having a greater biasing force than the first biasing means.

5. The cover body lock mechanism as claimed in claim 4, wherein when the regulating means is at the nonregulating position and the operating section is moved toward the unlocked position, the lock lever together with the operating section is moved to the unlocked position against the first biasing means, and when the regulating means is at the regulating position and the operating section is moved toward the unlocked position, only the operating section is moved to the unlocked position against the second biasing means.

6. The cover body lock mechanism as claimed in claim 5, wherein the body portion is capable of recording information signals onto a storage medium loaded therein, the operating section controls the recording of information signals by issuing recording instructions, and the regulating means moves from the nonregulating position to the regulating position in accordance with the recording instruction from the operating section.

* * * * *